(12) United States Patent
Zhang et al.

(10) Patent No.: US 12,057,914 B2
(45) Date of Patent: Aug. 6, 2024

(54) WIRELESS COMMUNICATION METHOD, DEVICE AND COMPUTER READABLE STORAGE MEDIUM THEREOF

(71) Applicant: ZTE Corporation, Guangdong (CN)

(72) Inventors: Yang Zhang, Guangdong (CN); Ke Yao, Guangdong (CN); Bo Gao, Guangdong (CN); Zhaohua Lu, Guangdong (CN); Yu Ngok Li, Guangdong (CN)

(73) Assignee: ZTE Corporation, Guangdong (CN)

( * ) Notice: Subject to any disclaimer, the term of this patent is extended or adjusted under 35 U.S.C. 154(b) by 0 days.

(21) Appl. No.: 17/851,736

(22) Filed: Jun. 28, 2022

(65) Prior Publication Data
US 2022/0376763 A1    Nov. 24, 2022

Related U.S. Application Data

(63) Continuation of application No. PCT/CN2020/083839, filed on Apr. 8, 2020.

(51) Int. Cl.
*H04B 7/06* (2006.01)
*H04B 7/0456* (2017.01)
*H04L 5/00* (2006.01)
*H04W 52/18* (2009.01)

(52) U.S. Cl.
CPC ......... *H04B 7/0689* (2013.01); *H04B 7/0482* (2013.01); *H04L 5/0048* (2013.01); *H04W 52/18* (2013.01)

(58) Field of Classification Search
CPC .. H04B 7/0689; H04B 7/0482; H04B 7/0404; H04B 7/0426; H04B 7/0456; H04B 7/063; H04L 5/0048; H04W 52/18; H04W 52/01
See application file for complete search history.

(56) References Cited

U.S. PATENT DOCUMENTS

| 2018/0254814 | A1  | 9/2018  | Park et al. |
| 2019/0327691 | A1* | 10/2019 | Zhang ................. H04W 52/226 |
| 2020/0154364 | A1* | 5/2020  | Rahman ............... H04B 7/0404 |
| 2020/0336998 | A1* | 10/2020 | Rahman ............... H04B 7/0639 |
| 2020/0408368 | A1* | 12/2020 | Lim ........................... F21K 9/68 |
| 2021/0258886 | A1* | 8/2021  | Sun ....................... H04W 52/58 |
| 2023/0008524 | A1* | 1/2023  | Okamura ............. H04B 7/0404 |

FOREIGN PATENT DOCUMENTS

| CN | 103023546 A | 4/2013 |
| CN | 107733493 A | 2/2018 |
| CN | 110535508 A | 12/2019 |

(Continued)

OTHER PUBLICATIONS

RI-1912041 Vivo Remaining issues on UL full power Tx , Nov. 18-22, 2019, 3GPP TSG RSN WG1 #99. (Year: 2019).*

(Continued)

*Primary Examiner* — Sophia Vlahos
(74) *Attorney, Agent, or Firm* — Crowell & Moring LLP

(57) ABSTRACT

A wireless communication method for a wireless terminal. The wireless communication method comprises reporting, to a wireless network node, at least one precoding matrix group of at least one codeword according to a transmission mode, receiving, from the wireless network node, at least one codeword, and performing a transmission based on power ratio of the codeword.

11 Claims, 2 Drawing Sheets

(56) References Cited

FOREIGN PATENT DOCUMENTS

| CN | 110971275 A | 4/2020 | | |
|---|---|---|---|---|
| WO | WO-2021032561 A2 | * | 2/2021 | ........... H04B 7/0404 |
| WO | WO-2021159409 A1 | * | 8/2021 | |

OTHER PUBLICATIONS

R1-1912895 NTT Docomo Inc, Full Tx Power UL transmission, Nov. 18-22, 2019, 3GPP TSG RAN WG1 #99. (Year: 2019).*

R1-1911048 MediaTek Inc., Full Tx power UL transmission, Oct. 14-20, 2019, 3GPP TSG RAN WG1 #98bis. (Year: 2019).*

Extended European Search Report received for Application No. EP 20889921.1 mailed Dec. 8, 2022 (10 pages).

International Search Report and Written Opinion received for Application No. PCT/CN2020/083839 mailed Dec. 30, 2020 (7 pages).

ZTE. "Full TX Power UL transmission" 3GPP TSG RAN WG1 Meeting #99 R1-1911932, Nov. 22, 2019 (7 pages).

CATT. "Remaining issues on UL full power transmission" 3GPP TSG RAN WG1 Meeting #100 RI-2000536, Mar. 6, 2020 (5 pages).

VIVO. "Feature lead summary on Full TX Power UL transmission" 3GPP TSG RAN WG1#99 R1-1912042, Nov. 22, 2019 (27 pages).

Office Action for China Patent Application No. 202080081811.2 mailed Apr. 25, 2024, with English translation (33 pages).

* cited by examiner

WIRELESS COMMUNICATION METHOD, DEVICE AND COMPUTER READABLE STORAGE MEDIUM THEREOF

PRIORITY

This application claims priority as a Continuation of PCT/CN2020/083839, filed on Apr. 8, 2020, entitled "A WIRELESS COMMUNICATION METHOD, DEVICE AND COMPUTER READABLE STORAGE MEDIUM THEREOF", published as WO 2021/098125 A1, the entirety of which is incorporated herein by reference.

TECHNICAL FIELD

This document is directed generally to wireless communications, in particular new radio (NR) systems, more particularly to 5G systems.

BACKGROUND

Alongside with the development of communication technologies, requirements of performances of wireless communication equipment keep increasing. For example, as to the uplink (UL) transmission of a terminal (e.g. a user equipment (UE)) side, the terminal should be allowed to support full power transmission under the maximum output power threshold. In current new radio (NR) systems, multi-antenna technologies allow the terminal to support non codebook based transmission utilizing full transmission power. However, there is still not a complete scheme for supporting the terminal to utilize the full transmission power when performing the codebook based transmission.

SUMMARY

This document relates to methods, systems, and devices for the codebook based transmission, and more particular to methods, systems, and devices for supporting the codebook based transmission with full transmission power.

The present disclosure relates to a wireless communication method for use in a wireless terminal. The wireless communication method comprises:
  reporting, to a wireless network node, at least one precoding matrix group of at least one codeword according to a transmission mode,
  receiving, from the wireless network node, at least one configured codeword, and
  performing a transmission based on power ratio of one of the at least one configured codeword.

Various embodiments may preferably implement the following features:

In some embodiments, a codeword is a precoder or a precoding matrix.

In some embodiments, the transmission mode is at least one of Mode 1, Mode 2, a full power transmission mode or a transmission mode indicating whether the at least one codeword supports full power transmission.

In some embodiments, the power ratio for a full power codebook reported by the wireless terminal is 1.

In some embodiments, the number of antenna ports configured for the transmission or the number of antenna ports configured for sounding reference signal, SRS, resources of the transmission is 4.

In some embodiments, a coherent capability of antenna ports configured for the transmission is non-coherent or partial-coherent.

In some embodiments, each of the at least one precoding matrix group consists of at least one basic precoding matrix group and the at least one basic precoding matrix group comprises at least one of:

$$BG0: \frac{1}{2}\begin{bmatrix}1\\0\\0\\0\end{bmatrix};$$

$$BG1: \left\{\frac{1}{2}\begin{bmatrix}1\\0\\0\\0\end{bmatrix}, \frac{1}{2}\begin{bmatrix}0\\0\\1\\0\end{bmatrix}\right\}, \frac{1}{2}\begin{bmatrix}1&0\\0&0\\0&1\\0&0\end{bmatrix};$$

$$BG2: \left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$BG3: \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$BG4: \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}1&0\\0&0\\0&1\\0&0\end{bmatrix};$$

$$BG5: \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix}; \text{ or}$$

$$BG6: \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$$

$$\left\{\frac{1}{2}\begin{bmatrix}0\\1\\0\\0\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\}, \left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}\right\},$$

$$\frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\}, \frac{1}{2}\begin{bmatrix}1&0&0\\0&1&0\\0&0&1\\0&0&0\end{bmatrix}.$$

In some embodiments, the at least one precoding matrix group comprises at least one of:

$$G0: \frac{1}{2}\begin{bmatrix}1\\0\\0\\0\end{bmatrix};$$

$$G1: \left\{\frac{1}{2}\begin{bmatrix}1\\0\\0\\0\end{bmatrix}, \frac{1}{2}\begin{bmatrix}0\\0\\1\\0\end{bmatrix}\right\}, \frac{1}{2}\begin{bmatrix}1&0\\0&0\\0&1\\0&0\end{bmatrix};$$

$$G2: \left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\},$$

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};\text{ or}$$

$$G3:\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix}.$$

In some embodiments, the at least one precoding matrix group comprises at least one of:

$$G0:\frac{1}{2}\begin{bmatrix}1\\0\\0\\0\end{bmatrix};$$

$$G1:\left\{\frac{1}{2}\begin{bmatrix}1\\0\\0\\0\end{bmatrix},\frac{1}{2}\begin{bmatrix}0\\0\\1\\0\end{bmatrix}\right\},\frac{1}{2}\begin{bmatrix}1&0\\0&0\\0&1\\0&0\end{bmatrix};$$

$$G2:\left\{\frac{1}{2}\begin{bmatrix}1\\0\\0\\0\end{bmatrix},\frac{1}{2}\begin{bmatrix}0\\1\\0\\0\end{bmatrix},\frac{1}{2}\begin{bmatrix}0\\0\\1\\0\end{bmatrix}\right\},$$

$$G3:\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$G4:\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},\frac{1}{2}\begin{bmatrix}1&0\\0&0\\0&1\\0&0\end{bmatrix};$$

$$G5:\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$G6:\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\},\left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix}\right\},$$

$$\frac{1}{2}\begin{bmatrix}1&0\\0&1\\0&0\\0&0\end{bmatrix},\frac{1}{2}\begin{bmatrix}1&0\\0&0\\0&1\\0&0\end{bmatrix},\frac{1}{2}\begin{bmatrix}0&0\\1&0\\0&1\\0&0\end{bmatrix},\frac{1}{2}\begin{bmatrix}0&0\\1&0\\0&0\\0&1\end{bmatrix},\frac{1}{2}\begin{bmatrix}1&0&0\\0&1&0\\0&0&1\\0&0&0\end{bmatrix};$$

$$G7:\frac{1}{2}\begin{bmatrix}1\\0\\0\\0\end{bmatrix},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},\frac{1}{2}\begin{bmatrix}1&0\\0&0\\0&1\\0&0\end{bmatrix};$$

$$G8:\left\{\frac{1}{2}\begin{bmatrix}1\\0\\0\\0\end{bmatrix},\frac{1}{2}\begin{bmatrix}1\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},\frac{1}{2}\begin{bmatrix}1&0\\0&0\\0&1\\0&0\end{bmatrix};$$

$$G9:\frac{1}{2}\begin{bmatrix}1\\0\\0\\0\end{bmatrix},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$G10:\left\{\frac{1}{2}\begin{bmatrix}1\\0\\0\\0\end{bmatrix},\frac{1}{2}\begin{bmatrix}0\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$G11:\left\{\frac{1}{2}\begin{bmatrix}1\\0\\0\\0\end{bmatrix},\frac{1}{2}\begin{bmatrix}0\\1\\0\\0\end{bmatrix},\frac{1}{2}\begin{bmatrix}0\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$G12:\frac{1}{2}\begin{bmatrix}1\\0\\0\\0\end{bmatrix},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\},\left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix}\right\},$$

$$\left\{\frac{1}{2}\begin{bmatrix}1&0\\0&1\\0&0\\0&0\end{bmatrix},\frac{1}{2}\begin{bmatrix}1&0\\0&0\\0&1\\0&0\end{bmatrix},\frac{1}{2}\begin{bmatrix}1&0\\0&0\\0&0\\0&1\end{bmatrix},\frac{1}{2}\begin{bmatrix}0&0\\1&0\\0&1\\0&0\end{bmatrix},\frac{1}{2}\begin{bmatrix}0&0\\1&0\\0&0\\0&1\end{bmatrix}\right\},\frac{1}{2}\begin{bmatrix}1&0&0\\0&1&0\\0&0&1\\0&0&0\end{bmatrix};$$

$$G13:\left\{\frac{1}{2}\begin{bmatrix}1\\0\\0\\0\end{bmatrix},\frac{1}{2}\begin{bmatrix}0\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\},$$

$$\left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix},\frac{1}{2}\begin{bmatrix}0&0\\0&0\\1&0\\0&1\end{bmatrix}\right\},$$

$$\frac{1}{2}\begin{bmatrix}1&0&0\\0&1&0\\0&0&1\\0&0&0\end{bmatrix};\text{ or}$$

$$G14:\left\{\frac{1}{2}\begin{bmatrix}1\\0\\0\\0\end{bmatrix},\frac{1}{2}\begin{bmatrix}0\\1\\0\\0\end{bmatrix},\frac{1}{2}\begin{bmatrix}0\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\}, \left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix}\right\},$$

$$\frac{1}{2}\begin{bmatrix}1&0\\0&1\\0&0\\0&0\end{bmatrix},\frac{1}{2}\begin{bmatrix}1&0\\0&0\\0&0\\0&1\end{bmatrix},\frac{1}{2}\begin{bmatrix}0&0\\1&0\\0&1\\0&0\end{bmatrix},\frac{1}{2}\begin{bmatrix}0&0\\1&0\\0&0\\0&1\end{bmatrix}\right\},\frac{1}{2}\begin{bmatrix}1&0&0\\0&1&0\\0&0&1\\0&0&0\end{bmatrix}$$

In some embodiments, the at least one precoding matrix group comprises at least one of:

$$G0: \frac{1}{2}\begin{bmatrix}1\\0\\0\\0\end{bmatrix};$$

$$G1: \left\{\left\{\frac{1}{2}\begin{bmatrix}1\\0\\0\\0\end{bmatrix},\frac{1}{2}\begin{bmatrix}0\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},\frac{1}{2}\begin{bmatrix}1&0\\0&0\\0&1\\0&0\end{bmatrix}\right\};$$

$$G2: \left\{\left\{\frac{1}{2}\begin{bmatrix}1\\0\\0\\0\end{bmatrix},\frac{1}{2}\begin{bmatrix}0\\1\\0\\0\end{bmatrix},\frac{1}{2}\begin{bmatrix}0\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\}\right\};$$

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$G3: \left\{\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},\frac{1}{2}\begin{bmatrix}1&0\\0&0\\0&1\\0&0\end{bmatrix}\right\};$$

$$G4: \left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$G5: \left\{\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\}\right\},$$

$$\left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix},\frac{1}{2}\begin{bmatrix}1&0\\0&1\\0&0\\0&0\end{bmatrix},\frac{1}{2}\begin{bmatrix}1&0\\0&0\\0&0\\0&1\end{bmatrix},\frac{1}{2}\begin{bmatrix}0&0\\1&0\\0&1\\0&0\end{bmatrix},\frac{1}{2}\begin{bmatrix}0&0\\1&0\\1&0\\0&1\end{bmatrix}\right\},$$

$$\frac{1}{2}\begin{bmatrix}1&0&0\\0&1&0\\0&0&1\\0&0&0\end{bmatrix};$$

$$G6: \frac{1}{2}\begin{bmatrix}1\\0\\0\\0\end{bmatrix}; \left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},\frac{1}{2}\begin{bmatrix}1&0\\0&0\\0&1\\0&0\end{bmatrix};$$

$$G7: \frac{1}{2}\begin{bmatrix}1\\0\\0\\0\end{bmatrix}; \left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$G8: \left\{\frac{1}{2}\begin{bmatrix}1\\0\\0\\0\end{bmatrix},\frac{1}{2}\begin{bmatrix}0\\0\\1\\0\end{bmatrix}\right\}, \left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$G9: \frac{1}{2}\begin{bmatrix}1\\0\\0\\0\end{bmatrix}, \left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\},\left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix}\right\}\right\},$$

$$\left\{\frac{1}{2}\begin{bmatrix}1&0\\0&1\\0&0\\0&0\end{bmatrix},\frac{1}{2}\begin{bmatrix}1&0\\0&0\\0&0\\0&1\end{bmatrix},\frac{1}{2}\begin{bmatrix}0&0\\1&0\\0&1\\0&0\end{bmatrix},\frac{1}{2}\begin{bmatrix}0&0\\1&0\\1&0\\0&1\end{bmatrix}\right\},\frac{1}{2}\begin{bmatrix}1&0&0\\0&1&0\\0&0&1\\0&0&0\end{bmatrix};$$

$$G10: \left\{\frac{1}{2}\begin{bmatrix}1\\0\\0\\0\end{bmatrix},\frac{1}{2}\begin{bmatrix}0\\0\\1\\0\end{bmatrix}\right\}, \left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\},$$

$$\left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix},\frac{1}{2}\begin{bmatrix}1&0\\0&1\\0&0\\0&0\end{bmatrix},\frac{1}{2}\begin{bmatrix}1&0\\0&0\\0&0\\0&1\end{bmatrix},\frac{1}{2}\begin{bmatrix}0&0\\1&0\\0&1\\0&0\end{bmatrix},\frac{1}{2}\begin{bmatrix}0&0\\1&0\\1&0\\0&1\end{bmatrix}\right\},$$

$$\frac{1}{2}\begin{bmatrix}1&0&0\\0&1&0\\0&0&1\\0&0&0\end{bmatrix}; \text{ or}$$

$$G11: \left\{\frac{1}{2}\begin{bmatrix}1\\0\\0\\0\end{bmatrix},\frac{1}{2}\begin{bmatrix}0\\1\\0\\0\end{bmatrix},\frac{1}{2}\begin{bmatrix}0\\0\\1\\0\end{bmatrix}\right\}, \left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\}, \left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix}\right\},$$

$$\left\{\frac{1}{2}\begin{bmatrix}1&0\\0&1\\0&0\\0&0\end{bmatrix},\frac{1}{2}\begin{bmatrix}1&0\\0&0\\0&0\\0&1\end{bmatrix},\frac{1}{2}\begin{bmatrix}0&0\\1&0\\0&1\\0&0\end{bmatrix},\frac{1}{2}\begin{bmatrix}0&0\\1&0\\1&0\\0&1\end{bmatrix}\right\},\frac{1}{2}\begin{bmatrix}1&0&0\\0&1&0\\0&0&1\\0&0&0\end{bmatrix}.$$

In some embodiments, the at least one precoding matrix group is transmitted by transmitting at least one transmitted precoding matrix indicator, TPMI, group corresponding to the at least one precoding matrix group.

In some embodiments, each of the at least one TPMI group consists of at least one basic TPMI group and the at least one basic TPMI group comprises at least one of:

BG0: 1 layer: TPMI=0;
BG1: 1 layer: TPMI=0, TPMI=2,
  2 layers: TPMI=1;
BG2: 1 layer: TPMI=0, TPMI=1, TPMI=2,
  2 layers: TPMI=1, TPMI=0, TPMI=3,
  3 layers: TPMI=0;
BG3: 2 layers: TPMI=1, TPMI=0, TPMI=3,
  3 layers: TPMI=0
BG4: 1 layer: TPMI=4, TPMI=5, TPMI=6, TPMI=7,
  2 layers: TPMI=1;
BG5: 1 layer: TPMI=4, TPMI=5, TPMI=6, TPMI=7,
  2 layers: TPMI=1, TPMI=0, TPMI=3,
  3 layers: TPMI=0; or
BG6: 1 layer: TPMI=4, TPMI=5, TPMI=6, TPMI=7, TPMI=8, TPMI=9, TPMI=10, TPMI=11,
  2 layers: TPMI=1, TPMI=4, TPMI=0, TPMI=2, TPMI=3, TPMI=5,
  3 layers: TPMI=0.

In some embodiments, the at least one TPMI group comprises at least one of:

G0: 1 layer: TPMI=0;
G1: 1 layer: TPMI=0, TPMI=2,
  2 layers: TPMI=1;
G2: 1 layer: TPMI=0, TPMI=1, TPMI=2,
  2 layers: TPMI=1, TPMI=0, TPMI=3,
  3 layers: TPMI=0; or
G3: 2 layers: TPMI=1, TPMI=0, TPMI=3,
  3 layers: TPMI=0.

In some embodiments, the at least one TPMI group comprises at least one of:

G0: 1 layer: TPMI=0;
G1: 1 layer: TPMI=0, TPMI=2,
  2 layers: TPMI=1;
G2: 1 layer: TPMI=0, TPMI=1, TPMI=2,
  2 layers: TPMI=1, TPMI=0, TPMI=3,
  3 layers: TPMI=0;
G3: 2 layers: TPMI=1, TPMI=0, TPMI=3,
  3 layers: TPMI=0;
G4: 1 layer: TPMI=4, TPMI=5, TPMI=6, TPMI=7,
  2 layers: TPMI=1;
G5: 1 layer: TPMI=4, TPMI=5, TPMI=6, TPMI=7,
  2 layers: TPMI=1, TPMI=0, TPMI=3,
  3 layers: TPMI=0;
G6: 1 layer: TPMI=4, TPMI=5, TPMI=6, TPMI=7, TPMI=8, TPMI=9, TPMI=10, TPMI=11,
  2 layers: TPMI=1, TPMI=4, TPMI=0, TPMI=2, TPMI=3, TPMI=5,
  3 layers: TPMI=0;
G7: 1 layer: TPMI=0, TPMI=4, TPMI=5, TPMI=6, TPMI=7,
  2 layers: TPMI=1;
G8: 1 layer: TPMI=0, TPMI=2, TPMI=4, TPMI=5, TPMI=6, TPMI=7,
  2 layers: TPMI=1;
G9: 1 layer: TPMI=0, TPMI=4, TPMI=5, TPMI=6, TPMI=7,
  2 layers: TPMI=1, TPMI=0, TPMI=3,
  3 layers: TPMI=0;
G10: 1 layer: TPMI=0, TPMI=2, TPMI=4, TPMI=5, TPMI=6, TPMI=7,
  2 layers: TPMI=1, TPMI=0, TPMI=3,
  3 layers: TPMI=0;
G11: 1 layer: TPMI=0, TPMI=1, TPMI=2, TPMI=4, TPMI=5, TPMI=6, TPMI=7,
  2 layers: TPMI=1, TPMI=0, TPMI=3,
  3 layers: TPMI=0;
G12: 1 layer: TPMI=0, TPMI=4, TPMI=5, TPMI=6, TPMI=7, TPMI=8, TPMI=9, TPMI=10, TPMI=11,
  2 layers: TPMI=1, TPMI=4, TPMI=0, TPMI=2, TPMI=3, TPMI=5,
  3 layers: TPMI=0;
G13: 1 layer: TPMI=0, TPMI=2, TPMI=4, TPMI=5, TPMI=6, TPMI=7, TPMI=8, TPMI=9, TPMI=10, TPMI=11,
  2 layers: TPMI=1, TPMI=4, TPMI=0, TPMI=2, TPMI=3, TPMI=5,
  3 layers: TPMI=0; or
G14: 1 layer: TPMI=0, TPMI=1, TPMI=2, TPMI=4, TPMI=5, TPMI=6, TPMI=7, TPMI=8, TPMI=9, TPMI=10, TPMI=11,
  2 layers: TPMI=1, TPMI=4, TPMI=0, TPMI=2, TPMI=3, TPMI=5,
  3 layers: TPMI=0.

In some embodiments, the at least one TPMI group comprises at least one of:

G0: 1 layer: TPMI=0;
G1: 1 layer: TPMI=0, TPMI=2, TPMI=4, TPMI=5, TPMI=6, TPMI=7,
  2 layers: TPMI=1;
G2: 1 layer: TPMI=0, TPMI=1, TPMI=2, TPMI=4, TPMI=5, TPMI=6, TPMI=7,
  2 layers: TPMI=1, TPMI=0, TPMI=3,
  3 layers: TPMI=0;
G3: 1 layer: TPMI=4, TPMI=5, TPMI=6, TPMI=7,
  2 layers: TPMI=1;
G4: 1 layer: TPMI=4, TPMI=5, TPMI=6, TPMI=7,
  2 layers: TPMI=1, TPMI=0, TPMI=3,
  3 layers: TPMI=0;
G5: 1 layer: TPMI=4, TPMI=5, TPMI=6, TPMI=7, TPMI=8, TPMI=9, TPMI=10, TPMI=11,
  2 layers: TPMI=1, TPMI=4, TPMI=0, TPMI=2, TPMI=3, TPMI=5,
  3 layers: TPMI=0;
G6: 1 layer: TPMI=0, TPMI=4, TPMI=5, TPMI=6, TPMI=7,
  2 layers: TPMI=1;
G7: 1 layer: TPMI=0, TPMI=4, TPMI=5, TPMI=6, TPMI=7,
  2 layers: TPMI=1, TPMI=0, TPMI=3,
  3 layers: TPMI=0;
G8: 1 layer: TPMI=0, TPMI=2, TPMI=4, TPMI=5, TPMI=6, TPMI=7,
  2 layers: TPMI=1, TPMI=0, TPMI=3,
  3 layers: TPMI=0;
G9: 1 layer: TPMI=0, TPMI=4, TPMI=5, TPMI=6, TPMI=7, TPMI=8, TPMI=9, TPMI=10, TPMI=11,
  2 layers: TPMI=1, TPMI=4, TPMI=0, TPMI=2, TPMI=3, TPMI=5,
  3 layers: TPMI=0;
G10: 1 layer: TPMI=0, TPMI=2, TPMI=4, TPMI=5, TPMI=6, TPMI=7, TPMI=8, TPMI=9, TPMI=10, TPMI=11,
  2 layers: TPMI=1, TPMI=4, TPMI=0, TPMI=2, TPMI=3, TPMI=5,
  3 layers: TPMI=0; or
G11: 1 layer: TPMI=0, TPMI=1, TPMI=2, TPMI=4, TPMI=5, TPMI=6, TPMI=7, TPMI=8, TPMI=9, TPMI=10, TPMI=11,
  2 layers: TPMI=1, TPMI=4, TPMI=0, TPMI=2, TPMI=3, TPMI=5,
  3 layers: TPMI=0.

In some embodiments, the wireless communication method further comprises reporting, to the wireless network node, information of codebook based transmission not supporting full power transmission.

In some embodiments, the information is indicated by a full power state indication field in an uplink control signaling.

In some embodiments, the information is indicated by an entry of a transmitted codebook field which is configured to indicate the at least one precoding matrix group.

The present disclosure relates to a wireless communication method for use in a wireless network node. The wireless communication method comprises:
- receiving, from a wireless terminal, at least one precoding matrix group of at least one codeword,
- transmitting, to the wireless terminal, at least one configured codeword, and performing a transmission based on power ratio of one of the at least one configured codeword.

Various embodiments may preferably implement the following features:

In some embodiments, a codeword is a precoder or a precoding matrix.

In some embodiments, the transmission mode is at least one of Mode 1, Mode 2, a full power transmission mode or a transmission mode indicating whether the at least one codeword supports full power transmission.

In some embodiments, the power ratio for a full power codebook reported by the wireless terminal is 1.

In some embodiments, the number of antenna ports configured for the transmission or the number of antenna ports configured for sounding reference signal, SRS, resources of the transmission is 4.

In some embodiments, a coherent capability of antenna ports configured for the transmission is non-coherent or partial-coherent.

In some embodiments, each of the at least one precoding matrix group consists of at least one basic precoding matrix group and the at least one basic precoding matrix group comprises at least one of:

$$BG0: \frac{1}{2}\begin{bmatrix}1\\0\\0\\0\end{bmatrix};$$

$$BG1: \left\{\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}\right\};$$

$$BG2: \left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix}\right\};$$

$$BG3: \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$BG4: \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}1&0\\0&0\\0&1\\0&0\end{bmatrix};$$

$$BG5: \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix}; \text{ or}$$

$$BG6: \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$$

$$\left\{\frac{1}{2}\begin{bmatrix}0\\1\\0\\0\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\}, \left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix},$$

$$\frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\}, \frac{1}{2}\begin{bmatrix}1&0&0\\0&1&0\\0&0&1\\0&0&0\end{bmatrix}.$$

In some embodiments, the at least one precoding matrix group comprises at least one of:

$$G0: \frac{1}{2}\begin{bmatrix}1\\0\\0\\0\end{bmatrix};$$

$$G1: \left\{\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}\right\};$$

$$G2: \left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\},$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix}; \text{ or}$$

$$G3: \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix}.$$

In some embodiments, the at least one precoding matrix group comprises at least one of:

$$G0: \frac{1}{2}\begin{bmatrix}1\\0\\0\\0\end{bmatrix};$$

$$G1: \left\{\frac{1}{2}\begin{bmatrix}1\\0\\0\\0\end{bmatrix}, \frac{1}{2}\begin{bmatrix}0\\0\\1\\0\end{bmatrix}, \frac{1}{2}\begin{bmatrix}1&0\\0&0\\0&1\\0&0\end{bmatrix}\right\};$$

$$G2: \left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\},$$

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$G3:\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$G4:\left\{\frac{1}{2}\begin{bmatrix}1\\1\\0\end{bmatrix},\frac{1}{2}\begin{bmatrix}1\\-1\\0\end{bmatrix},\frac{1}{2}\begin{bmatrix}1\\j\\0\end{bmatrix},\frac{1}{2}\begin{bmatrix}1\\-j\\0\end{bmatrix}\right\},\frac{1}{2}\begin{bmatrix}1&0\\0&0\\0&1\\0&0\end{bmatrix};$$

$$G5:\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\};$$

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$G6:\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\};$$

$$\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\},\left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix}\right\},$$

$$\left\{\frac{1}{2}\begin{bmatrix}1&0\\0&1\\0&0\\0&0\end{bmatrix},\frac{1}{2}\begin{bmatrix}1&0\\0&0\\0&0\\0&1\end{bmatrix},\frac{1}{2}\begin{bmatrix}0&0\\1&0\\0&1\\0&0\end{bmatrix},\frac{1}{2}\begin{bmatrix}0&0\\1&0\\0&0\\0&1\end{bmatrix},\frac{1}{2}\begin{bmatrix}1&0&0\\0&1&0\\0&0&1\\0&0&0\end{bmatrix};$$

$$G7:\frac{1}{2}\begin{bmatrix}1\\0\\0\\0\end{bmatrix},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},\frac{1}{2}\begin{bmatrix}1&0\\0&0\\0&1\\0&0\end{bmatrix};$$

$$G8:\left\{\frac{1}{2}\begin{bmatrix}1\\0\\0\\0\end{bmatrix},\frac{1}{2}\begin{bmatrix}1\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},\frac{1}{2}\begin{bmatrix}1&0\\0&0\\0&1\\0&0\end{bmatrix};$$

$$G9:\frac{1}{2}\begin{bmatrix}1\\0\\0\\0\end{bmatrix},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$G10:\left\{\frac{1}{2}\begin{bmatrix}1\\0\\0\\0\end{bmatrix},\frac{1}{2}\begin{bmatrix}0\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$G11:\left\{\frac{1}{2}\begin{bmatrix}1\\0\\0\\0\end{bmatrix},\frac{1}{2}\begin{bmatrix}0\\1\\0\\0\end{bmatrix},\frac{1}{2}\begin{bmatrix}0\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$G12:\frac{1}{2}\begin{bmatrix}1\\0\\0\\0\end{bmatrix},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\},\left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix}\right\},$$

$$\left\{\frac{1}{2}\begin{bmatrix}1&0\\0&1\\0&0\\0&0\end{bmatrix},\frac{1}{2}\begin{bmatrix}1&0\\0&0\\0&0\\0&1\end{bmatrix},\frac{1}{2}\begin{bmatrix}0&0\\1&0\\0&1\\0&0\end{bmatrix},\frac{1}{2}\begin{bmatrix}0&0\\1&0\\0&0\\0&1\end{bmatrix}\right\},\frac{1}{2}\begin{bmatrix}1&0&0\\0&1&0\\0&0&1\\0&0&0\end{bmatrix};$$

$$G13:\left\{\frac{1}{2}\begin{bmatrix}1\\0\\0\\0\end{bmatrix},\frac{1}{2}\begin{bmatrix}0\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\},$$

$$\left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix},\frac{1}{2}\begin{bmatrix}1&0\\0&1\\0&0\\0&0\end{bmatrix},\frac{1}{2}\begin{bmatrix}0&0\\0&0\\1&0\\0&1\end{bmatrix},\frac{1}{2}\begin{bmatrix}0&0\\1&0\\0&1\\0&0\end{bmatrix},\frac{1}{2}\begin{bmatrix}0&0\\0&0\\1&0\\0&1\end{bmatrix}\right\},$$

$$\frac{1}{2}\begin{bmatrix}1&0&0\\0&1&0\\0&0&1\\0&0&0\end{bmatrix};\text{ or}$$

$$G14:\left\{\frac{1}{2}\begin{bmatrix}1\\0\\0\\0\end{bmatrix},\frac{1}{2}\begin{bmatrix}0\\1\\0\\0\end{bmatrix},\frac{1}{2}\begin{bmatrix}0\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$

$$\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\},\left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix}\right\},$$

$$\left\{\frac{1}{2}\begin{bmatrix}1&0\\0&1\\0&0\\0&0\end{bmatrix},\frac{1}{2}\begin{bmatrix}1&0\\0&0\\0&0\\0&1\end{bmatrix},\frac{1}{2}\begin{bmatrix}0&0\\1&0\\0&1\\0&0\end{bmatrix},\frac{1}{2}\begin{bmatrix}0&0\\1&0\\0&0\\0&1\end{bmatrix}\right\},\frac{1}{2}\begin{bmatrix}1&0&0\\0&1&0\\0&0&1\\0&0&0\end{bmatrix}.$$

In some embodiments, the at least one precoding matrix group comprises at least one of:

$$G0:\frac{1}{2}\begin{bmatrix}1\\0\\0\\0\end{bmatrix};$$

$$G1:\left\{\frac{1}{2}\begin{bmatrix}1\\0\\0\\0\end{bmatrix},\frac{1}{2}\begin{bmatrix}0\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},\frac{1}{2}\begin{bmatrix}1&0\\0&0\\0&1\\0&0\end{bmatrix};$$

$$G2: \left\{ \frac{1}{2}\begin{bmatrix}1\\1\\0\\0\end{bmatrix}, \frac{1}{2}\begin{bmatrix}0\\1\\0\\0\end{bmatrix}, \frac{1}{2}\begin{bmatrix}1\\0\\1\\0\end{bmatrix} \right\}, \left\{ \frac{1}{2}\begin{bmatrix}1\\1\\1\\0\end{bmatrix}, \frac{1}{2}\begin{bmatrix}1\\0\\-1\\0\end{bmatrix}, \frac{1}{2}\begin{bmatrix}1\\j\\0\\0\end{bmatrix}, \frac{1}{2}\begin{bmatrix}1\\0\\-j\\0\end{bmatrix} \right\},$$

$$\left\{ \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix} \right\}, \frac{1}{2}\begin{bmatrix}1&0&0\\0&1&0\\0&0&1\\0&0&0\end{bmatrix};$$

$$G3: \left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\}, \frac{1}{2}\begin{bmatrix}1&0\\0&0\\0&1\\0&0\end{bmatrix};$$

$$G4: \left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\},$$

$$\left\{ \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix} \right\}, \frac{1}{2}\begin{bmatrix}1&0&0\\0&1&0\\0&0&1\\0&0&0\end{bmatrix};$$

$$G5: \left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\}, \left\{ \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix} \right\},$$

$$\left\{ \frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix} \right\},$$

$$\frac{1}{2}\begin{bmatrix}1&0&0\\0&1&0\\0&0&1\\0&0&0\end{bmatrix};$$

$$G6: \frac{1}{2}\begin{bmatrix}1\\0\\0\\0\end{bmatrix}; \left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\}, \frac{1}{2}\begin{bmatrix}1&0\\0&0\\0&1\\0&0\end{bmatrix};$$

$$G7: \frac{1}{2}\begin{bmatrix}1\\0\\0\\0\end{bmatrix}; \left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\},$$

$$\left\{ \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix} \right\}, \frac{1}{2}\begin{bmatrix}1&0&0\\0&1&0\\0&0&1\\0&0&0\end{bmatrix};$$

$$G8: \left\{ \frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}1\\0\\1\\0\end{bmatrix} \right\}, \left\{ \frac{1}{2}\begin{bmatrix}1\\1\\1\\0\end{bmatrix}, \frac{1}{2}\begin{bmatrix}1\\0\\-1\\0\end{bmatrix}, \frac{1}{2}\begin{bmatrix}1\\j\\0\\0\end{bmatrix}, \frac{1}{2}\begin{bmatrix}1\\0\\-j\\0\end{bmatrix} \right\},$$

$$\left\{ \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix} \right\}, \frac{1}{2}\begin{bmatrix}1&0&0\\0&1&0\\0&0&1\\0&0&0\end{bmatrix};$$

$$G9: \frac{1}{2}\begin{bmatrix}1\\0\\0\\0\end{bmatrix}, \left\{ \frac{1}{2}\begin{bmatrix}1\\1\\0\\0\end{bmatrix}, \frac{1}{2}\begin{bmatrix}1\\0\\1\\0\end{bmatrix}, \frac{1}{2}\begin{bmatrix}1\\-1\\0\\0\end{bmatrix}, \frac{1}{2}\begin{bmatrix}1\\j\\0\\0\end{bmatrix}, \frac{1}{2}\begin{bmatrix}1\\0\\-j\\0\end{bmatrix} \right\},$$

$$\left\{ \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix} \right\}, \left\{ \frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix} \right\},$$

$$\left\{ \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix} \right\}, \frac{1}{2}\begin{bmatrix}1&0&0\\0&1&0\\0&0&1\\0&0&0\end{bmatrix};$$

$$G10: \left\{ \frac{1}{2}\begin{bmatrix}1\\0\\0\\0\end{bmatrix}, \frac{1}{2}\begin{bmatrix}0\\1\\0\\0\end{bmatrix} \right\}, \left\{ \frac{1}{2}\begin{bmatrix}1\\1\\1\\0\end{bmatrix}, \frac{1}{2}\begin{bmatrix}1\\0\\-1\\0\end{bmatrix}, \frac{1}{2}\begin{bmatrix}1\\j\\0\\0\end{bmatrix}, \frac{1}{2}\begin{bmatrix}1\\0\\-j\\0\end{bmatrix} \right\},$$

$$\left\{ \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix} \right\},$$

$$\left\{ \frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix} \right\},$$

$$\frac{1}{2}\begin{bmatrix}1&0&0\\0&1&0\\0&0&1\\0&0&0\end{bmatrix}; \text{ or}$$

$$G11: \left\{ \frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\1\\1\\0\end{bmatrix} \right\}, \left\{ \frac{1}{2}\begin{bmatrix}1\\1\\1\\0\end{bmatrix}, \frac{1}{2}\begin{bmatrix}1\\0\\-1\\0\end{bmatrix}, \frac{1}{2}\begin{bmatrix}1\\j\\0\\0\end{bmatrix}, \frac{1}{2}\begin{bmatrix}1\\0\\-j\\0\end{bmatrix} \right\},$$

$$\left\{ \frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix} \right\}, \left\{ \frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix} \right\},$$

$$\left\{ \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix} \right\}, \frac{1}{2}\begin{bmatrix}1&0&0\\0&1&0\\0&0&1\\0&0&0\end{bmatrix}.$$

In some embodiments, the at least one precoding matrix group is transmitted by transmitting at least one transmitted precoding matrix indicator, TPMI, group corresponding to the at least one precoding matrix group.

In some embodiments, each of the at least one TPMI group consists of at least one basic TPMI group and the at least one basic TPMI group comprises at least one of:
BG0: 1 layer: TPMI=0;
BG1: 1 layer: TPMI=0, TPMI=2,
  2 layers: TPMI=1;
BG2: 1 layer: TPMI=0, TPMI=1, TPMI=2,
  2 layers: TPMI=1, TPMI=0, TPMI=3,
  3 layers: TPMI=0;
BG3: 2 layers: TPMI=1, TPMI=0, TPMI=3,
  3 layers: TPMI=0
BG4: 1 layer: TPMI=4, TPMI=5, TPMI=6, TPMI=7,
  2 layers: TPMI=1;
BG5: 1 layer: TPMI=4, TPMI=5, TPMI=6, TPMI=7,
  2 layers: TPMI=1, TPMI=0, TPMI=3,
  3 layers: TPMI=0; or
BG6: 1 layer: TPMI=4, TPMI=5, TPMI=6, TPMI=7,
  TPMI=8, TPMI=9, TPMI=10, TPMI=11,
  2 layers: TPMI=1, TPMI=4, TPMI=0, TPMI=2,
  TPMI=3, TPMI=5,
  3 layers: TPMI=0.

In some embodiments, the at least one TPMI group comprises at least one of:
G0: 1 layer: TPMI=0;
G1: 1 layer: TPMI=0, TPMI=2,
  2 layers: TPMI=1;

G2: 1 layer: TPMI=0, TPMI=1, TPMI=2,
   2 layers: TPMI=1, TPMI=0, TPMI=3,
   3 layers: TPMI=0; or
G3: 2 layers: TPMI=1, TPMI=0, TPMI=3,
   3 layers: TPMI=0.
In some embodiments, the at least one TPMI group comprises at least one of:
G0: 1 layer: TPMI=0;
G1: 1 layer: TPMI=0, TPMI=2,
   2 layers: TPMI=1;
G2: 1 layer: TPMI=0, TPMI=1, TPMI=2,
   2 layers: TPMI=1, TPMI=0, TPMI=3,
   3 layers: TPMI=0;
G3: 2 layers: TPMI=1, TPMI=0, TPMI=3,
   3 layers: TPMI=0;
G4: 1 layer: TPMI=4, TPMI=5, TPMI=6, TPMI=7,
   2 layers: TPMI=1;
G5: 1 layer: TPMI=4, TPMI=5, TPMI=6, TPMI=7,
   2 layers: TPMI=1, TPMI=0, TPMI=3,
   3 layers: TPMI=0;
G6: 1 layer: TPMI=4, TPMI=5, TPMI=6, TPMI=7, TPMI=8, TPMI=9, TPMI=10, TPMI=11,
   2 layers: TPMI=1, TPMI=4, TPMI=0, TPMI=2, TPMI=3, TPMI=5,
   3 layers: TPMI=0;
G7: 1 layer: TPMI=0, TPMI=4, TPMI=5, TPMI=6, TPMI=7,
   2 layers: TPMI=1;
G8: 1 layer: TPMI=0, TPMI=2, TPMI=4, TPMI=5, TPMI=6, TPMI=7,
   2 layers: TPMI=1;
G9: 1 layer: TPMI=0, TPMI=4, TPMI=5, TPMI=6, TPMI=7,
   2 layers: TPMI=1, TPMI=0, TPMI=3,
   3 layers: TPMI=0;
G10: 1 layer: TPMI=0, TPMI=2, TPMI=4, TPMI=5, TPMI=6, TPMI=7,
   2 layers: TPMI=1, TPMI=0, TPMI=3,
   3 layers: TPMI=0;
G11: 1 layer: TPMI=0, TPMI=1, TPMI=2, TPMI=4, TPMI=5, TPMI=6, TPMI=7,
   2 layers: TPMI=1, TPMI=0, TPMI=3,
   3 layers: TPMI=0;
G12: 1 layer: TPMI=0, TPMI=4, TPMI=5, TPMI=6, TPMI=7, TPMI=8, TPMI=9, TPMI=10, TPMI=11,
   2 layers: TPMI=1, TPMI=4, TPMI=0, TPMI=2, TPMI=3, TPMI=5,
   3 layers: TPMI=0;
G13: 1 layer: TPMI=0, TPMI=2, TPMI=4, TPMI=5, TPMI=6, TPMI=7, TPMI=8, TPMI=9, TPMI=10, TPMI=11,
   2 layers: TPMI=1, TPMI=4, TPMI=0, TPMI=2, TPMI=3, TPMI=5,
   3 layers: TPMI=0; or
G14: 1 layer: TPMI=0, TPMI=1, TPMI=2, TPMI=4, TPMI=5, TPMI=6, TPMI=7, TPMI=8, TPMI=9, TPMI=10, TPMI=11,
   2 layers: TPMI=1, TPMI=4, TPMI=0, TPMI=2, TPMI=3, TPMI=5,
   3 layers: TPMI=0.
In some embodiments, the at least one TPMI group comprises at least one of:
G0: 1 layer: TPMI=0;
G1: 1 layer: TPMI=0, TPMI=2, TPMI=4, TPMI=5, TPMI=6, TPMI=7,
   2 layers: TPMI=1;
G2: 1 layer: TPMI=0, TPMI=1, TPMI=2, TPMI=4, TPMI=5, TPMI=6, TPMI=7,
   2 layers: TPMI=1, TPMI=0, TPMI=3,
   3 layers: TPMI=0;
G3: 1 layer: TPMI=4, TPMI=5, TPMI=6, TPMI=7,
   2 layers: TPMI=1;
G4: 1 layer: TPMI=4, TPMI=5, TPMI=6, TPMI=7,
   2 layers: TPMI=1, TPMI=0, TPMI=3,
   3 layers: TPMI=0;
G5: 1 layer: TPMI=4, TPMI=5, TPMI=6, TPMI=7, TPMI=8, TPMI=9, TPMI=10, TPMI=11,
   2 layers: TPMI=1, TPMI=4, TPMI=0, TPMI=2, TPMI=3, TPMI=5,
   3 layers: TPMI=0;
G6: 1 layer: TPMI=0, TPMI=4, TPMI=5, TPMI=6, TPMI=7,
   2 layers: TPMI=1;
G7: 1 layer: TPMI=0, TPMI=4, TPMI=5, TPMI=6, TPMI=7,
   2 layers: TPMI=1, TPMI=0, TPMI=3,
   3 layers: TPMI=0;
G8: 1 layer: TPMI=0, TPMI=2, TPMI=4, TPMI=5, TPMI=6, TPMI=7,
   2 layers: TPMI=1, TPMI=0, TPMI=3,
   3 layers: TPMI=0;
G9: 1 layer: TPMI=0, TPMI=4, TPMI=5, TPMI=6, TPMI=7, TPMI=8, TPMI=9, TPMI=10, TPMI=11,
   2 layers: TPMI=1, TPMI=4, TPMI=0, TPMI=2, TPMI=3, TPMI=5,
   3 layers: TPMI=0;
G10: 1 layer: TPMI=0, TPMI=2, TPMI=4, TPMI=5, TPMI=6, TPMI=7, TPMI=8, TPMI=9, TPMI=10, TPMI=11,
   2 layers: TPMI=1, TPMI=4, TPMI=0, TPMI=2, TPMI=3, TPMI=5,
   3 layers: TPMI=0; or
G11: 1 layer: TPMI=0, TPMI=1, TPMI=2, TPMI=4, TPMI=5, TPMI=6, TPMI=7, TPMI=8, TPMI=9, TPMI=10, TPMI=11,
   2 layers: TPMI=1, TPMI=4, TPMI=0, TPMI=2, TPMI=3, TPMI=5,
   3 layers: TPMI=0.

In some embodiments, the wireless communication method further comprises receiving, from the wireless terminal, information of codebook based transmission not supporting full power transmission.

In some embodiments, the information is indicated by a full power state indication field in an uplink control signaling.

In some embodiments, the information is indicated by an entry of a transmitted codebook field which is configured to indicate the at least one precoding matrix group.

The present disclosure relates to a wireless terminal. The wireless terminal comprises:
 a communication unit, configured to report, to a wireless network node, at least one precoding matrix group of at least one codeword according to a transmission mode of the wireless terminal, and receive, from the wireless network node, at least one configured codeword, and
 a processor, configured to determine the transmission mode, and perform a transmission based on power ratio of one of the at least one configured codeword.

Various embodiments may preferably implement the following feature:
In some embodiments, the processor is further configured to perform a wireless communication method of any of the foregoing described methods.

The present disclosure relates to a wireless network node. The wireless network node comprises:

a communication unit, configured to receive, from a wireless terminal, at least one precoding matrix group of at least one codeword and transmit, to the wireless terminal, at least one configured codeword, and a processor, configured to perform a transmission based on power ratio of one of the at least one configured codeword.

Various embodiments may preferably implement the following feature:

In some embodiments, the processor is further configured to perform a wireless communication method of any of the foregoing described methods.

The present disclosure relates to a computer program product comprising a computer-readable program medium code stored thereupon, the code, when executed by a processor, causing the processor to implement a method of any of the foregoing described methods.

The exemplary embodiments disclosed herein are directed to providing features that will become readily apparent by reference to the following description when taken in conjunction with the accompany drawings. In accordance with various embodiments, exemplary systems, methods, devices and computer program products are disclosed herein. It is understood, however, that these embodiments are presented by way of example and not limitation, and it will be apparent to those of ordinary skill in the art who read the present disclosure that various modifications to the disclosed embodiments can be made while remaining within the scope of the present disclosure.

Thus, the present disclosure is not limited to the exemplary embodiments and applications described and illustrated herein. Additionally, the specific order and/or hierarchy of steps in the methods disclosed herein are merely exemplary approaches. Based upon design preferences, the specific order or hierarchy of steps of the disclosed methods or processes can be re-arranged while remaining within the scope of the present disclosure. Thus, those of ordinary skill in the art will understand that the methods and techniques disclosed herein present various steps or acts in a sample order, and the present disclosure is not limited to the specific order or hierarchy presented unless expressly stated otherwise.

BRIEF DESCRIPTION OF THE DRAWINGS

The above and other aspects and their implementations are described in greater detail in the drawings, the descriptions, and the claims.

DETAILED DESCRIPTION

Figure 1:
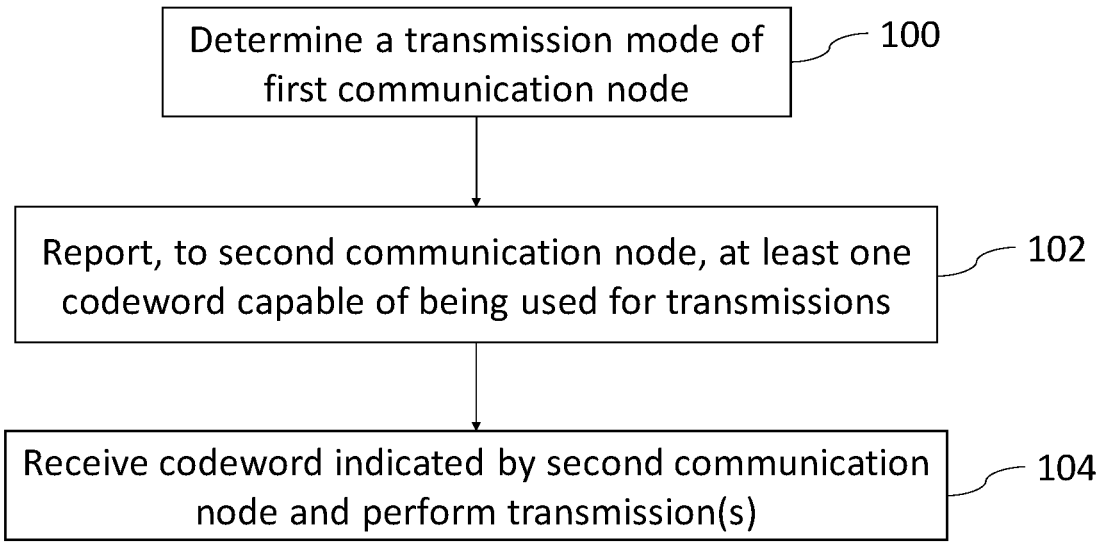
FIG. 1 shows a flowchart of a wireless communication method according to an embodiment of the present disclosure.
Figure 2:
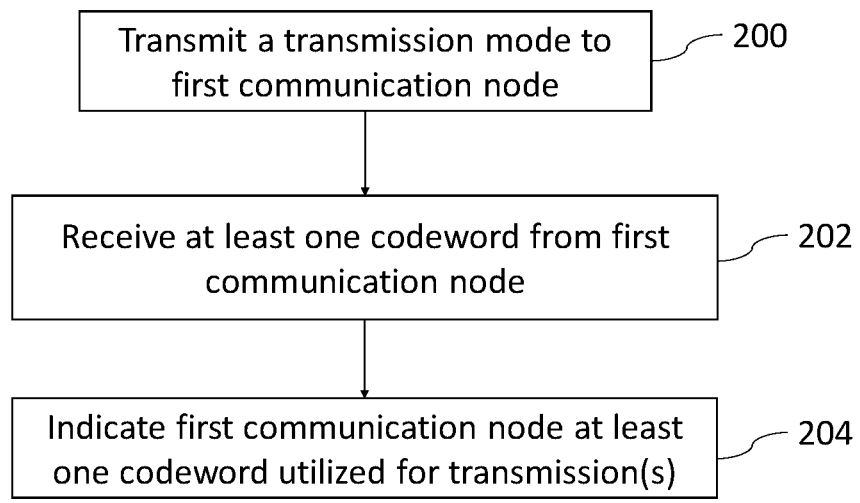
FIG. 2 shows a flowchart of a wireless communication method according to an embodiment of the present disclosure.

In present disclosure, a codeword may be a precoder or a precoding matrix.

In present disclosure, a codebook may be a set of precoder(s), a set of precoding matrices or a set of codeword(s).

Alongside with development of communication technologies, requirements of performances of wireless communication equipment keep increasing. In order to support a full power transmission for uplink (UL) transmission of a terminal side (e.g. a user equipment (UE)), a first transmission mode and a second transmission mode (i.e. Mode 1 and Mode 2) are proposed in existing technologies. As to multi-antenna precoding methods of the second transmission mode (i.e Mode 2), the present disclosure provides embodiments of reporting codeword group(s) to reduce signaling overhead and support terminals with various and different power amplifier (PA) architectures to achieve the full power transmission (e.g. for UL transmission(s)).

More specifically, in order to support the terminal to utilize a part of antennas to achieve the full power transmission, the existing technologies of a new radio (NR) system introduces two transmission modes, i.e. Mode 1 and Mode 2, wherein the Mode 1 adopts the multi-antenna precoding for supporting the full power transmission and the Mode 2 adopts both the multi-antenna precoding and antenna ports virtualization for supporting the full power transmission. In an embodiment of the terminal having 4 antenna ports and operating under the Mode 2, this terminal may report the codebook in a form of precoding matrix group(s) when utilizing the multi-antenna precoding to perform the full power transmission, so as to reduce signaling overhead. Under such a condition, how to design the precoding matrix group(s) to reduce the signaling overhead while supporting UEs with different and various PA architectures to perform the full power transmission becomes a topic to be discussed.

For ease of illustrations, the following firstly describes certain concepts or technical terminologies.

Generally, a base station (BS) may determine the number of antenna ports based on a capability of transmission antennas of a user terminal (i.e. a UE) and may configure the UE to transmit sounding reference signal(s) (SRS(s)). The SRS is utilized to measure UL channels, which is also called channel sounding. After acquiring results of the channel sounding, the BS accordingly determines multiple-input-multiple-output (MIMO) parameters (e.g. the number of layers, precoding, . . . , etc.) for subsequent UL transmission(s) and instructs the number of layers and corresponding precoding matrices (i.e. transmitted precoding matrix indicator (TPMI)) to the UE. The UE then uses the precoding matrix instructed by the BS to perform precoding on data and transmits the data to the BS.

In the NR system, the UL transmissions adopting the MIMO may be classified into codebook based transmissions and non-codebook based transmissions. Note that, a codebook is an information set of a group of predefined codeword(s) and corresponding layers and comprises at least one codeword. Each codeword is a matrix utilized for the precoding of multi-ports of transmission terminal (i.e. UE). Thus, the codeword is also called a precoding matrix. Each row of the precoding matrix represents an antenna port and each column of the precoding matrix represent a layer (e.g. MIMO layer). For example, table I shown in the following is a codebook for 1 layer transmission using 4 antenna ports under a condition that transform precoder is disabled.

TABLE I

Precoding matrix W of using 4 antenna ports for performing single layer
transmission when the transform precoder is disabled

| TPMI index | W (TPMI index increases from left to right) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\-1\end{bmatrix}$ $\frac{1}{2}\begin{bmatrix}1\\1\\j\\j\end{bmatrix}$ $\frac{1}{2}\begin{bmatrix}1\\1\\-1\\1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\1\end{bmatrix}$ $\frac{1}{2}\begin{bmatrix}1\\j\\-1\\-j\end{bmatrix}$ $\frac{1}{2}\begin{bmatrix}1\\j\\-j\\-1\end{bmatrix}$ $\frac{1}{2}\begin{bmatrix}1\\-1\\1\\1\end{bmatrix}$ $\frac{1}{2}\begin{bmatrix}1\\-1\\j\\-j\end{bmatrix}$ $\frac{1}{2}\begin{bmatrix}1\\-1\\-1\\-1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\-1\end{bmatrix}$ $\frac{1}{2}\begin{bmatrix}1\\-j\\-1\\j\end{bmatrix}$ $\frac{1}{2}\begin{bmatrix}1\\-j\\-j\\1\end{bmatrix}$ — — — — |

As can be seen from table I, the codebook comprises 28 precoding matrices and each of the precoding matrices has 4 rows and 1 column.

The BS may further configure an SRS resource set for the UE, wherein the SRS resource set comprises at least one SRS resource. The SRS resource set may be utilized for at least one of: beam management, antenna switching, codebook or non-codebook. Note that, the BS configures the UE to transmit the SRS resource(s) in the SRS resource set, which is utilized for the codebook and non-codebook, for allowing the BS to measure the UL channels, which is also called channel sounding. Based on the results of the channel sounding, the BS determines the transmission parameters for the subsequent UL transmissions. For example, the BS utilizes the SRS resource set configured for the codebook for dispatching codebook based UL transmissions and utilizes the SRS resource set configured for the non-codebook for non-codebook based UL transmissions.

The BS may configure different SRS resources for the UE and the UE transmits different SRSs on different SRS resources. Thus, the BS is required to indicate SRS resource indicator (SRI) for the UL transmissions. Different SRS resources are corresponding to different transmitted beam resources (sets), different antenna panels (sets) or different precoding methods of antenna ports.

As to the codebook based transmissions, the BS selects appropriate precoding information (i.e. codeword) among predefined codebook based on measured channel(s) and indicates the selected precoding information to the UE via indicating TPMI corresponding to the selected precoding information.

As to non-codebook based transmissions, the BS does not need to indicate the corresponding TPMI to the UE. But if the UE utilizes multiple antenna ports, the UE is able to determine precoding information for the transmissions itself.

In an example of the UL transmissions being physical UL shared channel (PUSCH) transmissions, when the BS dispatches the PUSCH transmissions, the BS utilizes an SRI field of downlink (DL) control information (DCI) in a physical layer signaling to indicate one or more SRS resources in the SRS resource set as references of determining transmission parameters of the PUSCH transmissions. For example, the UE may use the same filter parameters of the SRS resource indicated by the BS to transmit the dispatched PUSCH transmissions.

As to codebook based PUSCH transmissions, a bit length of the SRI field in the DCI is determined based on the number of the SRS resources in the SRS resource set. For example, when the number of the SRS resources in the SRS resource set is 2, the SRI field requires only 1 bit.

Further, according to the number of ports supported by the SRS resource, the DCI utilizes a precoding information and number of layers field to indicate MIMO parameters (e.g. the number of MIMO layers and a precoding matrix) of the PUSCH transmissions.

For example, table II shown in the following shows contents of the precoding information and number of layers field when the maximum rank of 4 antenna ports is 2, 3 or 4.

TABLE II

Precoding information and number of layers field of 4 antenna ports (transform
precoder is disabled and the maximum rank (maxrank) is 2, 3 or 4)

| mapped index of bit field | Parameter codebookSubset is fullyAndPartialAnd-Noncoherent | mapped index of bit field | Parameter codebookSubset is partialAndNonCoherent | mapped index of bit field | Parameter codebookSubset is noncoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |

TABLE II-continued

Precoding information and number of layers field of 4 antenna ports (transform precoder is disabled and the maximum rank (maxrank) is 2, 3 or 4)

| mapped index of bit field | Parameter codebookSubset is fullyAndPartialAndNoncoherent | mapped index of bit field | Parameter codebookSubset is partialAndNonCoherent | mapped index of bit field | Parameter codebookSubset is noncoherent |
|---|---|---|---|---|---|
| ... | ... | ... | ... | ... | ... |
| 3 | 1 layer: TPMI = 3 | 3 | 1 layer: TPMI = 3 | 3 | 1 layer: TPMI = 3 |
| 4 | 2 layers: TPMI = 0 | 4 | 2 layers: TPMI = 0 | 4 | 2 layers: TPMI = 0 |
| ... | ... | ... | ... | ... | ... |
| 9 | 2 layers: TPMI = 5 | 9 | 2 layers: TPMI = 5 | 9 | 2 layers: TPMI = 5 |
| 10 | 3 layers: TPMI = 0 | 10 | 3 layers: TPMI = 0 | 10 | 3 layers: TPMI = 0 |
| 11 | 4 layers: TPMI = 0 | 11 | 4 layers: TPMI = 0 | 11 | 4 layers: TPMI = 0 |
| 12 | 1 layer: TPMI = 4 | 12 | 1 layer: TPMI = 4 | 12-15 | reserved |
| ... | ... | ... | ... | | |
| 19 | 1 layer: TPMI = 11 | 19 | 1 layer: TPMI = 11 | | |
| 20 | 2 layers: TPMI = 6 | 20 | 2 layers: TPMI = 6 | | |
| ... | ... | ... | ... | | |
| 27 | 2 layers: TPMI = 13 | 27 | 2 layers: TPMI = 13 | | |
| 28 | 3 layers: TPMI = 1 | 28 | 3 layers: TPMI = 1 | | |
| 29 | 3 layers: TPMI = 2 | 29 | 3 layers: TPMI = 2 | | |
| 30 | 4 layers: TPMI = 1 | 30 | 4 layers: TPMI = 1 | | |
| 31 | 4 layers: TPMI = 2 | 31 | 4 layers: TPMI = 2 | | |
| 32 | 1 layers: TPMI = 12 | | | | |
| ... | ... | | | | |
| 47 | 1 layers: TPMI = 27 | | | | |
| 48 | 2 layers: TPMI = 14 | | | | |
| ... | ... | | | | |
| 55 | 2 layers: TPMI = 21 | | | | |
| 56 | 3 layers: TPMI = 3 | | | | |
| ... | ... | | | | |
| 59 | 3 layers: TPMI = 6 | | | | |
| 60 | 4 layers: TPMI = 3 | | | | |
| 61 | 4 layers: TPMI = 4 | | | | |
| 62-63 | reserved | | | | |

As shown in the table II, the precoding information and number of layers field of the parameter codebookSubset set to fullyAndPartialAndNonCoherent has 62 valid indications and the bit length of the precoding information and number of layers field is 6 bits. The precoding information and number of layers field of the parameter codebookSubset set to PartialAndNonCoherent has 32 valid indications and the bit length of the precoding information and number of layers field is 5 bits. The precoding information and number of layers field of the parameter codebookSubset set to NonCoherent has 12 valid indications and the bit length of the precoding information and number of layers field is 4 bits. Table III shown in the following is utilized to express contents of the precoding information and number of layers field when the maximum rank of 4 antenna ports is 1, wherein each column is corresponding to different coherent capabilities (i.e. fully coherent, partial-coherent and/or non-coherent).

TABLE III

Precoding information and number of layers field of 4 antenna ports (transform precoder is enabled or disabled and the maximum rank (maxrank) is 2, 3 or 4)

| mapped index of bit field | Parameter codebookSubset is fullyAndPartialAndNoncoherent | mapped index of bit field | Parameter codebookSubset is partialAndNonCoherent | mapped index of bit field | Parameter codebookSubset is noncoherent |
|---|---|---|---|---|---|
| 0 | 1 layer: TPMI = 0 | 0 | 1 layer: TPMI = 0 | 0 | 1 layer: TPMI = 0 |
| 1 | 1 layer: TPMI = 1 | 1 | 1 layer: TPMI = 1 | 1 | 1 layer: TPMI = 1 |
| ... | ... | ... | ... | ... | ... |
| 3 | 1 layer: TPMI = 3 | 3 | 1 layer: TPMI = 3 | 3 | 1 layer: TPMI = 3 |
| 4 | 1 layer: TPMI = 4 | 4 | 1 layer: TPMI = 4 | | |
| ... | ... | ... | ... | | |
| 11 | 1 layer: TPMI = 11 | 11 | 1 layer: TPMI = 11 | | |
| 12 | 1 layers: TPMI = 12 | 12-15 | reserved | | |
| ... | ... | | | | |
| 27 | 1 layers: TPMI = 27 | | | | |
| 28-31 | reserved | | | | |

As shown in the table III, the precoding information and number of layers field of the parameter codebookSubset set to fullyAndPartialAndNonCoherent has 32 valid indications and the bit length of the precoding information and number of layers field is 5 bits. The precoding information and number of layers field of the parameter codebookSubset set to PartialAndNonCoherent has 16 valid indications and the bit length of the precoding information and number of layers field is 4 bits. The precoding information and number of layers field of the parameter codebookSubset set to NonCoherent has 4 valid indications and the bit length of the precoding information and number of layers field is 2 bits.

According to the aforementioned tables I, II and III, the precoding matrices for transmissions using 1, 2, 3 or 4 layers can be separately summarized into tables IV, V, VI and VII shown in the following, wherein the precoding matrices of 1 layer are shown by those corresponding to the TPMI indexes in table IV (or table I), the precoding matrices of 2 layer are shown by those corresponding to the TPMI indexes in table V, the precoding matrices of 3 layer are shown by those corresponding to the TPMI indexes in table VI and the precoding matrices of 4 layer are shown by those corresponding to the TPMI indexes in table VII.

TABLE IV

Precoding matrix W of using 4 antenna ports for performing 1 layer transmission when the transform precoder is disabled

| TPMI index | W (TPMI index increases from left to right) |
|---|---|
| 0-7 | $\frac{1}{2}\begin{bmatrix}1\\0\\0\\0\end{bmatrix}$ $\frac{1}{2}\begin{bmatrix}0\\1\\0\\0\end{bmatrix}$ $\frac{1}{2}\begin{bmatrix}0\\0\\1\\0\end{bmatrix}$ $\frac{1}{2}\begin{bmatrix}0\\0\\0\\1\end{bmatrix}$ $\frac{1}{2}\begin{bmatrix}1\\0\\1\\0\end{bmatrix}$ $\frac{1}{2}\begin{bmatrix}1\\0\\-1\\0\end{bmatrix}$ $\frac{1}{2}\begin{bmatrix}1\\0\\j\\0\end{bmatrix}$ $\frac{1}{2}\begin{bmatrix}1\\0\\-j\\0\end{bmatrix}$ |
| 8-15 | $\frac{1}{2}\begin{bmatrix}0\\1\\0\\1\end{bmatrix}$ $\frac{1}{2}\begin{bmatrix}0\\1\\0\\-1\end{bmatrix}$ $\frac{1}{2}\begin{bmatrix}0\\1\\0\\j\end{bmatrix}$ $\frac{1}{2}\begin{bmatrix}0\\1\\0\\-j\end{bmatrix}$ $\frac{1}{2}\begin{bmatrix}1\\1\\1\\1\end{bmatrix}$ $\frac{1}{2}\begin{bmatrix}1\\1\\j\\j\end{bmatrix}$ $\frac{1}{2}\begin{bmatrix}1\\1\\-1\\-1\end{bmatrix}$ $\frac{1}{2}\begin{bmatrix}1\\1\\-j\\-j\end{bmatrix}$ |
| 16-23 | $\frac{1}{2}\begin{bmatrix}1\\j\\1\\j\end{bmatrix}$ $\frac{1}{2}\begin{bmatrix}1\\j\\j\\-1\end{bmatrix}$ $\frac{1}{2}\begin{bmatrix}1\\j\\-1\\-j\end{bmatrix}$ $\frac{1}{2}\begin{bmatrix}1\\j\\-j\\1\end{bmatrix}$ $\frac{1}{2}\begin{bmatrix}1\\-1\\1\\-1\end{bmatrix}$ $\frac{1}{2}\begin{bmatrix}1\\-1\\j\\-j\end{bmatrix}$ $\frac{1}{2}\begin{bmatrix}1\\-1\\-1\\1\end{bmatrix}$ $\frac{1}{2}\begin{bmatrix}1\\-1\\-j\\j\end{bmatrix}$ |
| 24-27 | $\frac{1}{2}\begin{bmatrix}1\\-j\\1\\-j\end{bmatrix}$ $\frac{1}{2}\begin{bmatrix}1\\-j\\j\\1\end{bmatrix}$ $\frac{1}{2}\begin{bmatrix}1\\-j\\-1\\j\end{bmatrix}$ $\frac{1}{2}\begin{bmatrix}1\\-j\\-j\\-1\end{bmatrix}$ — — — — |

TABLE V

Precoding matrix W of using 4 antenna ports for performing 2 layers transmission when the transform precoder is disabled

| TPMI index | W (TPMI index increases from left to right) |
|---|---|
| 0-3 | $\frac{1}{2}\begin{bmatrix}1&0\\0&1\\0&0\\0&0\end{bmatrix}$ $\frac{1}{2}\begin{bmatrix}1&0\\0&0\\0&1\\0&0\end{bmatrix}$ $\frac{1}{2}\begin{bmatrix}1&0\\0&0\\0&0\\0&1\end{bmatrix}$ $\frac{1}{2}\begin{bmatrix}0&0\\1&0\\0&1\\0&0\end{bmatrix}$ |
| 4-7 | $\frac{1}{2}\begin{bmatrix}0&0\\1&0\\0&0\\0&1\end{bmatrix}$ $\frac{1}{2}\begin{bmatrix}0&0\\0&0\\1&0\\0&1\end{bmatrix}$ $\frac{1}{2}\begin{bmatrix}1&0\\0&1\\1&0\\0&-j\end{bmatrix}$ $\frac{1}{2}\begin{bmatrix}1&0\\0&1\\1&0\\0&j\end{bmatrix}$ |
| 8-11 | $\frac{1}{2}\begin{bmatrix}1&0\\0&1\\-j&0\\0&1\end{bmatrix}$ $\frac{1}{2}\begin{bmatrix}1&0\\0&1\\-j&0\\0&-1\end{bmatrix}$ $\frac{1}{2}\begin{bmatrix}1&0\\0&1\\-1&0\\0&-j\end{bmatrix}$ $\frac{1}{2}\begin{bmatrix}1&0\\0&1\\-1&0\\0&j\end{bmatrix}$ |
| 12-15 | $\frac{1}{2}\begin{bmatrix}1&0\\0&1\\j&0\\0&1\end{bmatrix}$ $\frac{1}{2}\begin{bmatrix}1&0\\0&1\\j&0\\0&-1\end{bmatrix}$ $\frac{1}{2\sqrt{2}}\begin{bmatrix}1&1\\1&1\\1&-1\\1&-1\end{bmatrix}$ $\frac{1}{2\sqrt{2}}\begin{bmatrix}1&1\\1&1\\j&-j\\j&-j\end{bmatrix}$ |

TABLE V-continued

Precoding matrix W of using 4 antenna ports for performing 2 layers transmission when the transform precoder is disabled

| TPMI index | W (TPMI index increases from left to right) | | | |
|---|---|---|---|---|
| 16-19 | $\frac{1}{2\sqrt{2}}\begin{bmatrix} 1 & 1 \\ j & j \\ 1 & -1 \\ j & -j \end{bmatrix}$ | $\frac{1}{2\sqrt{2}}\begin{bmatrix} 1 & 1 \\ j & j \\ j & -j \\ -1 & 1 \end{bmatrix}$ | $\frac{1}{2\sqrt{2}}\begin{bmatrix} 1 & 1 \\ -1 & -1 \\ 1 & -1 \\ -1 & 1 \end{bmatrix}$ | $\frac{1}{2\sqrt{2}}\begin{bmatrix} 1 & 1 \\ -1 & -1 \\ j & -j \\ -j & j \end{bmatrix}$ |
| 20-21 | $\frac{1}{2\sqrt{2}}\begin{bmatrix} 1 & 1 \\ -j & -j \\ 1 & -1 \\ -j & j \end{bmatrix}$ | $\frac{1}{2\sqrt{2}}\begin{bmatrix} 1 & 1 \\ -j & -j \\ j & -j \\ 1 & -1 \end{bmatrix}$ | — | — |

TABLE VI

Precoding matrix W of using 4 antenna ports for performing 3 layers transmission when the transform precoder is disabled

| TPMI index | W (TPMI index increase from left to right) | | | |
|---|---|---|---|---|
| 0-3 | $\frac{1}{2}\begin{bmatrix} 1 & 0 & 0 \\ 0 & 1 & 0 \\ 0 & 0 & 1 \\ 0 & 0 & 0 \end{bmatrix}$ | $\frac{1}{2}\begin{bmatrix} 1 & 0 & 0 \\ 0 & 1 & 0 \\ 1 & 0 & 0 \\ 0 & 0 & 1 \end{bmatrix}$ | $\frac{1}{2}\begin{bmatrix} 1 & 0 & 0 \\ 0 & 1 & 0 \\ -1 & 0 & 0 \\ 0 & 0 & 1 \end{bmatrix}$ | $\frac{1}{2\sqrt{3}}\begin{bmatrix} 1 & 1 & 1 \\ 1 & -1 & 1 \\ 1 & 1 & -1 \\ 1 & -1 & -1 \end{bmatrix}$ |
| 4-6 | $\frac{1}{2\sqrt{3}}\begin{bmatrix} 1 & 1 & 1 \\ 1 & -1 & 1 \\ j & j & -j \\ j & -j & -j \end{bmatrix}$ | $\frac{1}{2\sqrt{3}}\begin{bmatrix} 1 & 1 & 1 \\ -1 & 1 & -1 \\ 1 & 1 & -1 \\ -1 & 1 & 1 \end{bmatrix}$ | $\frac{1}{2\sqrt{3}}\begin{bmatrix} 1 & 1 & 1 \\ -1 & 1 & -1 \\ j & j & -j \\ -j & j & j \end{bmatrix}$ | — |

TABLE VII

Precoding matrix W of using 4 antenna ports for performing 4 layers transmission when the transform precoder isdisabled

| TPMI index | W (TPMI index increases from left to right) | | | |
|---|---|---|---|---|
| 0-3 | $\frac{1}{2}\begin{bmatrix} 1 & 0 & 0 & 0 \\ 0 & 1 & 0 & 0 \\ 0 & 0 & 1 & 0 \\ 0 & 0 & 0 & 1 \end{bmatrix}$ | $\frac{1}{2\sqrt{2}}\begin{bmatrix} 1 & 1 & 0 & 0 \\ 0 & 0 & 1 & 1 \\ 1 & -1 & 0 & 0 \\ 0 & 0 & 1 & -1 \end{bmatrix}$ | $\frac{1}{2\sqrt{2}}\begin{bmatrix} 1 & 1 & 0 & 0 \\ 0 & 0 & 1 & 1 \\ j & -j & 0 & 0 \\ 0 & 0 & j & -j \end{bmatrix}$ | $\frac{1}{4}\begin{bmatrix} 1 & 1 & 1 & 1 \\ 1 & -1 & 1 & -1 \\ 1 & 1 & -1 & -1 \\ 1 & -1 & -1 & 1 \end{bmatrix}$ |
| 4 | $\frac{1}{4}\begin{bmatrix} 1 & 1 & 1 & 1 \\ 1 & -1 & 1 & -1 \\ j & j & -j & -j \\ j & -j & -j & j \end{bmatrix}$ | — | — | — |

As can be seen from the above, the UE is able to utilize full power to perform non-codebook based transmissions. However, there is not a complete scheme of allowing the UE to utilize the full power to perform the codebook based transmission. The present disclosure provides a mobile communication network (includes but is not limited to 5th generation (5G) mobile communication network), wherein a network architecture of the provided mobile communication network may comprise terminals (e.g. UEs, subscriber identification module cards, relays, mobile devices, etc.) and network side devices (e.g. one or more types of BSs, communication nodes, access pints, relays, Node B (NB), universal terrestrial radio access (UTRA), Evolved UTRA (EUTRA), etc.). In embodiments of the present disclosure, a transmission method (e.g. a wireless communication method), a device and computer readable storage medium can be applied to the above mentioned network architecture are provided to enhance transceiving performances of antennas and are suitable for various kinds of communication node for increasing universality. An operation environment of the transmission method provided in the embodiments of the present disclosure is not limited to the above mentioned network architecture.

Note that, the UL transmission in the present disclosure may comprise at least one of PUSCH transmission, physical UL control channel (PUCCH) transmission or SRS transmission. In order to simplifying illustrations, the following embodiments are exemplified by utilizing the PUSCH transmission.

The transmission method and device provided by the present disclosure and technical effects are described as the following.

Embodiment #1

FIG. 1 shows a flow chart of a transmission method according to an embodiment of the present disclosure. In this embodiment, the transmission method may be applied to (e.g. performed by) a first communication node, wherein the first communication node may be a transmission terminal (e.g. a user terminal or a UE). More specifically, the transmission method comprises the following steps:

In step 100, the first communication node determines a transmission mode of the first communication node.

In an embodiment, the transmission mode comprises at least one of:
- a first transmission mode, i.e. Mode 1;
- a second transmission mode, i.e. Mode 2;
- a full power transmission mode; or
- a transmission mode supporting indicating whether a transmitted codeword is in a full power state.

In an embodiment, step 100 may be optional. For example, the transmission mode may be configured (e.g. indicated) by another communication node (e.g. a base station (BS)).

In an embodiment, the coherent capability of antenna ports means whether the relative phase between ports can be adjusted. In the case of full coherence, it can be assumed that the UE can control the relative phase between any of the up to four ports that are to be used for transmission. In the case of partial coherence, the UE is capable of pairwise coherence, that is, the device can control the relative phase within pairs of ports. However, there is no guarantee of coherence, that is, a controllable phase, between the pairs. Finally, in the case of no coherence there is no guarantee of coherence between any pair of the device antenna ports.

In an embodiment, the power ratio for a full power codebook reported by the wireless terminal is 1.

In an embodiment, the number of antenna ports configured for (UL) transmission(s) of the first communication node is 4, the parameter codebookSubset is set to nonCoherent (i.e. the relationship between 4 antenna ports is noncoherent) and a parameter ULFPTxModes is set to Mode 2 (i.e. the transmission mode is Mode 2). For example, the number of antenna ports configured for SRS resources related to the transmissions of the first communication node is 4. In this embodiment, the precoding matrix group(s) and/or the TPMI group(s) reported to the first communication node may comprise at least one of precoding matrix groups G0 to G3 shown in the following Table VIII.

TABLE VIII

Precoding matrix groups and TPMI group(s) thereof for 4 antenna ports
(codebookSubset = "noncoherent", ULFPTxModes = "Mode 2")

| index | Precoding Matrices | TPMI(s) |
|---|---|---|
| G0 | $\frac{1}{2}\begin{bmatrix}1\\0\\0\\0\end{bmatrix}$ | 1 layer: TPMI = 0 |
| G1 | $\left\{\frac{1}{2}\begin{bmatrix}1\\0\\0\\0\end{bmatrix}, \frac{1}{2}\begin{bmatrix}0\\0\\1\\0\end{bmatrix}\right\}, \frac{1}{2}\begin{bmatrix}10\\00\\01\\00\end{bmatrix}$ | 1 layer: TPMI = 0, TPMI = 2; 2 layers: TPMI = 1; |
| G2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\right\}, \frac{1}{2}\begin{bmatrix}100\\010\\001\\000\end{bmatrix}$ | 1 layer: TPMI = 0, TPMI = 1, TPMI = 2; 2 layers: TPMI = 1, TPMI = 0, TPMI = 3; 3 layers: TPMI = 0; |
| G3 | $\left\{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\right\}, \frac{1}{2}\begin{bmatrix}100\\010\\001\\000\end{bmatrix}$ | 2 layers: TPMI = 1, TPMI = 0, TPMI = 3; 3 layers: TPMI = 0; |

In step 102, the first communication node reports at least one codeword to a second communication node (e.g. a network node or a BS) according to (e.g. based on) the transmission mode. In an embodiment, the reported at least one codeword may be capable of being used for performing (subsequent) transmission(s).

In an embodiment, the at least one codeword may be reported in a form of at least one precoding matrix group and/or at least one TPMI group corresponding to the at least one precoding matrix group. That is, the first communication node may report at least one precoding matrix group and/or at least one corresponding TPMI group to the second communication node, to indicate the codebook which may be utilized for subsequent (UL) transmissions.

In an embodiment, the precoding matrix group G0 shown in table VIII is used for supporting a UE with 4 antenna ports whose PAs are equal to or greater than (i.e. not smaller than) [23 17 17 17] dBm (e.g. PA=[23 17 17 17] dBm) to perform the UL full power transmission.

In an embodiment, the precoding matrix group G1 shown in table VIII is used for supporting a UE with 4 antenna ports whose PAs are equal to or greater than [23 17 23 17] dBm (i.e. PA=[23 17 23 17] dBm) to perform the UL full power transmission.

In an embodiment, the precoding matrix group G2 shown in table VIII is used for supporting a UE with 4 antenna ports whose PAs are equal to or greater than [23 23 23 17] dBm (i.e. PA=[23 23 23 17] dBm) to perform the UL full power transmission.

In an embodiment, the precoding matrix group G3 shown in table VIII is used for supporting a UE with 4 antenna ports whose PAs are equal to or greater than [20 20 20 17] dBm (i.e. PA=[20 20 20 17] dBm) to perform the UL full power transmission.

In an embodiment, the number of antenna ports configured for transmissions of the first communication node is 4 (e.g. the number of antenna ports configured for SRS resources related to transmissions of the first communication node is 4), the parameter codebookSubset is set to partialAndnonCoherent (i.e. the relationship among 4 antenna ports is partial-coherent or noncoherent) and a parameter ULFPTxModes is set to Mode 2 (i.e. the communication node of the first communication node is Mode 2). In this embodiment, the precoding matrix group(s) and/or the corresponding TPMI group(s) reported by the first communication node may comprise at least one of precoding matrix groups G0 to G14 shown in the following Table IX.

TABLE IX

Precoding matrix groups and TPMI group(s) thereof for 4 antenna ports
(codebookSubset = "partialAndnonCoherent", ULFPTxModes = "Mode 2")

| index | Precoding Matrices | TPMI(s) |
|---|---|---|
| G0 | $\frac{1}{2}\begin{bmatrix}1\\0\\0\\0\end{bmatrix}$ | 1 layer: TPMI = 0; |
| G1 | $\left\{\frac{1}{2}\begin{bmatrix}1\\0\\0\\0\end{bmatrix}, \frac{1}{2}\begin{bmatrix}0\\0\\1\\0\end{bmatrix}\right\}, \frac{1}{2}\begin{bmatrix}10\\00\\01\\00\end{bmatrix}$ | 1 layer: TPMI = 0, TPMI = 2; 2 layers: TPMI = 1; |
| G2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\right\}, \frac{1}{2}\begin{bmatrix}100\\010\\001\\000\end{bmatrix}$ | 1 layer: TPMI = 0, TPMI = 1, TPMI = 2; 2 layers: TPMI = 1, TPMI = 0, TPMI = 3; 3 layers: TPMI = 0; |
| G3 | $\left\{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\right\}, \frac{1}{2}\begin{bmatrix}100\\010\\001\\000\end{bmatrix}$ | 2 layers: TPMI = 1, TPMI = 0, TPMI = 3; 3 layers: TPMI = 0; |
| G4 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}10\\00\\01\\00\end{bmatrix}$ | 1 layer: TPMI = 4, TPMI = 5, TPMI = 6, TPMI = 7; 2 layers: TPMI = 1; |
| G5 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\right\}, \frac{1}{2}\begin{bmatrix}100\\010\\001\\000\end{bmatrix}$ | 1 layer: TPMI = 4, TPMI = 5, TPMI = 6, TPMI = 7; 2 layers: TPMI = 1, TPMI = 0, TPMI = 3; 3 layers: TPMI = 0; |
| G6 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$ $\left\{\frac{1}{2}\begin{bmatrix}10\\00\\01\\00\end{bmatrix}, \frac{1}{2}\begin{bmatrix}00\\10\\00\\01\end{bmatrix}, \frac{1}{2}\begin{bmatrix}10\\01\\00\\00\end{bmatrix}, \frac{1}{2}\begin{bmatrix}10\\00\\00\\01\end{bmatrix}, \frac{1}{2}\begin{bmatrix}00\\10\\01\\00\end{bmatrix}, \frac{1}{2}\begin{bmatrix}00\\00\\10\\01\end{bmatrix}\right\}, \frac{1}{2}\begin{bmatrix}100\\010\\001\\000\end{bmatrix}$ | 1 layer: TPMI = 4, TPMI = 5, TPMI = 6, TPMI = 7, TPMI = 8, TPMI = 9, TPMI = 10, TPMI = 11; 2 layers: TPMI = 1, TPMI = 4, TPMI = 0 TPMI = 2, TPMI = 3, TPMI = 5; 3 layers: TPMI = 0; |
| G7 | $\frac{1}{2}\begin{bmatrix}1\\0\\0\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}10\\00\\01\\00\end{bmatrix}$ | 1 layer: TPMI = 0, TPMI = 4, TPMI = 5, TPMI = 6, TPMI = 7; 2 layers: TPMI = 1; |
| G8 | $\left\{\frac{1}{2}\begin{bmatrix}1\\0\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}10\\00\\01\\00\end{bmatrix}$ | 1 layer: TPMI = 0, TPMI = 2, TPMI = 4, TPMI = 5, TPMI = 6, TPMI = 7; 2 layers: TPMI = 1; |
| G9 | $\frac{1}{2}\begin{bmatrix}1\\0\\0\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\right\}, \frac{1}{2}\begin{bmatrix}100\\010\\001\\000\end{bmatrix}$ | 1 layer: TPMI = 0, TPMI = 4, TPMI = 5, TPMI = 6, TPMI = 7; 2 layers: TPMI = 1, TPMI = 0, TPMI = 3; 3 layers: TPMI = 0; |

TABLE IX-continued

Precoding matrix groups and TPMI group(s) thereof for 4 antenna ports
(codebookSubset = "partialAndnonCoherent", ULFPTxModes = "Mode 2")

| index | Precoding Matrices | TPMI(s) |
|---|---|---|
| G10 | $\left\{\begin{bmatrix}1\\0\\\frac{1}{2}\\0\end{bmatrix}, \begin{bmatrix}0\\0\\\frac{1}{2}\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\right\}, \frac{1}{2}\begin{bmatrix}100\\010\\001\\000\end{bmatrix}$ | 1 layer: TPMI = 0, TPMI = 2, TPMI = 4, TPMI = 5, TPMI = 6, TPMI = 7; 2 layers: TPMI = 1, TPMI = 0, TPMI = 3; 3 layers: TPMI = 0; |
| G11 | $\left\{\begin{bmatrix}1\\0\\\frac{1}{2}\\0\end{bmatrix}, \begin{bmatrix}0\\1\\\frac{1}{2}\\0\end{bmatrix}, \begin{bmatrix}0\\0\\\frac{1}{2}\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\right\}, \frac{1}{2}\begin{bmatrix}100\\010\\001\\000\end{bmatrix}$ | 1 layer: TPMI = 0, TPMI = 1, TPMI = 2, TPMI = 4, TPMI = 5, TPMI = 6, TPMI = 7; 2 layers: TPMI = 1, TPMI = 0, TPMI = 3; 3 layers: TPMI = 0; |
| G12 | $\frac{1}{2}\begin{bmatrix}1\\0\\0\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\}$, $\left\{\frac{1}{2}\begin{bmatrix}10\\00\\01\\00\end{bmatrix}, \frac{1}{2}\begin{bmatrix}00\\10\\00\\01\end{bmatrix}, \frac{1}{2}\begin{bmatrix}10\\00\\00\\00\end{bmatrix}, \frac{1}{2}\begin{bmatrix}10\\00\\00\\01\end{bmatrix}, \frac{1}{2}\begin{bmatrix}00\\10\\01\\00\end{bmatrix}, \frac{1}{2}\begin{bmatrix}00\\00\\10\\01\end{bmatrix}\right\}, \frac{1}{2}\begin{bmatrix}100\\010\\001\\000\end{bmatrix}$ | 1 layer: TPMI = 0, TPMI = 4, TPMI = 5, TPMI = 6, TPMI = 7, TPMI = 8, TPMI = 9, TPMI = 10, TPMI = 11; 2 layers: TPMI = 1, TPMI = 4, TPMI = 0, TPMI = 2, TPMI = 3, TPMI = 5; 3 layers: TPMI = 0; |
| G13 | $\left\{\begin{bmatrix}1\\\frac{1}{2}\\0\\0\end{bmatrix}, \begin{bmatrix}0\\\frac{1}{2}\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\}$, $\left\{\frac{1}{2}\begin{bmatrix}10\\00\\01\\00\end{bmatrix}, \frac{1}{2}\begin{bmatrix}00\\10\\00\\01\end{bmatrix}, \frac{1}{2}\begin{bmatrix}10\\01\\00\\00\end{bmatrix}, \frac{1}{2}\begin{bmatrix}10\\00\\00\\01\end{bmatrix}, \frac{1}{2}\begin{bmatrix}00\\10\\01\\00\end{bmatrix}, \frac{1}{2}\begin{bmatrix}00\\00\\10\\01\end{bmatrix}\right\}, \frac{1}{2}\begin{bmatrix}100\\010\\001\\000\end{bmatrix}$ | 1 layer: TPMI = 0, TPMI = 2, TPMI = 4, TPMI = 5, TPMI = 6, TPMI = 7, TPMI = 8, TPMI = 9, TPMI = 10, TPMI = 11; 2 layers: TPMI = 1, TPMI = 4, TPMI = 0, TPMI = 2, TPMI = 3, TPMI = 5; 3 layers: TPMI = 0; |
| G14 | $\left\{\begin{bmatrix}1\\\frac{1}{2}\\0\\0\end{bmatrix}, \begin{bmatrix}0\\\frac{1}{2}\\1\\0\end{bmatrix}, \begin{bmatrix}0\\\frac{1}{2}\\0\\1\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\}$, $\left\{\frac{1}{2}\begin{bmatrix}10\\00\\01\\00\end{bmatrix}, \frac{1}{2}\begin{bmatrix}00\\10\\00\\01\end{bmatrix}, \frac{1}{2}\begin{bmatrix}10\\01\\00\\00\end{bmatrix}, \frac{1}{2}\begin{bmatrix}10\\00\\00\\01\end{bmatrix}, \frac{1}{2}\begin{bmatrix}00\\10\\01\\00\end{bmatrix}, \frac{1}{2}\begin{bmatrix}00\\00\\10\\01\end{bmatrix}\right\}, \frac{1}{2}\begin{bmatrix}100\\010\\001\\000\end{bmatrix}$ | 1 layer: TPMI = 0, TPMI = 1, TPMI = 2, TPMI = 4, TPMI = 5, TPMI = 6, TPMI = 7, TPMI = 8, TPMI = 9, TPMI = 10, TPMI = 11; 2 layers: TPMI = 1, TPMI = 4, TPMI = 0, TPMI = 2, TPMI = 3, TPMI = 5; 3 layers: TPMI = 0; |

In an embodiment, the precoding matrix group G0 shown in table IX may be used for supporting a UE with 4 antenna ports whose PAs are equal to or greater than [23 17 17 17] dBm (e.g. PA=[23 17 17 17] dBm) to perform the UL full power transmission.

In an embodiment, the precoding matrix group G1 shown in table IX is used for supporting a UE with 4 antenna ports whose PAs are equal to or greater than [23 17 23 17] dBm (e.g. PA=[23 17 23 17] dBm) to perform the UL full power transmission.

In an embodiment, the precoding matrix group G2 shown in table IX is used for supporting a UE with 4 antenna ports whose PAs are equal to or greater than [23 23 23 17] dBm (e.g. PA=[23 23 23 17] dBm) to perform the UL full power transmission.

In an embodiment, the precoding matrix group G3 shown in table IX is used for supporting a UE with 4 antenna ports whose PAs are equal to or greater than [20 20 20 17] dBm (e.g. PA=[20 20 20 17] dBm) to perform the UL full power transmission.

In an embodiment, the precoding matrix group G4 shown in table IX is used for supporting a UE with 4 antenna ports whose PAs are equal to or greater than [20 17 20 17] dBm (e.g. PA=[20 17 20 17] dBm) to perform the UL full power transmission.

In an embodiment, the precoding matrix group G5 shown in table IX is used for supporting a UE with 4 antenna ports whose PAs are equal to or greater than [20 20 20 17] dBm (e.g. PA=[20 20 20 17] dBm) to perform the UL full power transmission.

In an embodiment, the precoding matrix group G6 shown in table IX is used for supporting a UE with 4 antenna ports whose PAs are equal to or greater than [20 20 20 20] dBm (e.g. PA=[20 20 20 20] dBm) to perform the UL full power transmission.

In an embodiment, the precoding matrix group G7 shown in table IX is used for supporting a UE with 4 antenna ports whose PAs are equal to or greater than [23 17 20 17] dBm (e.g. PA=[23 17 20 17] dBm) to perform the UL full power transmission.

In an embodiment, the precoding matrix group G8 shown in table IX is used for supporting a UE with 4 antenna ports whose PAs are equal to or greater than [23 17 23 17] dBm (e.g. PA=[23 17 23 17] dBm) to perform the UL full power transmission.

In an embodiment, the precoding matrix group G9 shown in table IX is used for supporting a UE with 4 antenna ports whose PAs are equal to or greater than [23 20 20 17] dBm (e.g. PA=[23 20 20 17] dBm) to perform the UL full power transmission.

In an embodiment, the precoding matrix group G10 shown in table IX is used for supporting a UE with 4 antenna ports whose PAs are equal to or greater than [23 20 23 17] dBm (e.g. PA=[23 20 23 17] dBm) to perform the UL full power transmission.

In an embodiment, the precoding matrix group G11 shown in table IX is used for supporting a UE with 4 antenna ports whose PAs are equal to or greater than [23 23 23 17] dBm (e.g. PA=[23 23 23 17] dBm) to perform the UL full power transmission.

In an embodiment, the precoding matrix group G12 shown in table IX is used for supporting a UE with 4 antenna ports whose PAs are equal to or greater than [23 20 20 20] dBm (e.g. PA=[23 20 20 20] dBm) to perform the UL full power transmission.

In an embodiment, the precoding matrix group G13 shown in table IX is used for supporting a UE with 4 antenna ports whose PAs are equal to or greater than [23 20 23 20] dBm (e.g. PA=[23 20 23 20] dBm) to perform the UL full power transmission.

In an embodiment, the precoding matrix group G14 shown in table IX is used for supporting a UE with 4 antenna ports whose PAs are equal to or greater than [23 23 23 20] dBm (e.g. PA=[23 23 23 20] dBm) to perform the UL full power transmission.

As can be seen from table IX, the PA corresponding to the precoding matrix group G3 is the same with that corresponding to the precoding matrix group G5. Note that, the precoding matrix group G3 is used for supporting the noncoherent UE to achieve the UL full power transmission and the precoding matrix group G5 is used for supporting the partial-coherent UE to achieve the UL full power transmission.

In addition, the PAs corresponding to the precoding matrix group G1 are the same with those corresponding to the precoding matrix group G8 and the PAs corresponding to the precoding matrix group G2 are the same with those corresponding to the precoding matrix group G11. Note that, the precoding matrix group G1 and/or G2 is used for supporting the noncoherent UE to achieve the UL full power transmission and the precoding matrix group G10 and/or G11 is used for supporting the partial-coherent UE or non-coherent UE to achieve the UL full power transmission.

In an embodiment, the number of antenna ports configured for transmissions of the first communication node is 4 (e.g. the number of antenna ports configured for SRS resources related to transmissions of the first communication node is 4), the parameter codebookSubset is set to partialAndnonCoherent (i.e. the relationship among 4 antenna ports is partial-coherent or non-coherent), a parameter ULFPTxModes is set to Mode 2 (i.e. the communication node of the first communication node is Mode 2). In this embodiment, the precoding matrix group(s) and the TPMI group(s) corresponding to the precoding matrix group(s) comprise at least one of G0 to G11 shown in the following Table X.

TABLE X

Precoding matrix groups and TPMI group(s) thereof for 4 antenna ports (codebookSubset = "partialAndnonCoherent", ULFPTxModes = "Mode 2")

| index | Precoding Matrices | TPMI(s) |
|---|---|---|
| G0 | $\frac{1}{2}\begin{bmatrix}1\\0\\0\\0\end{bmatrix}$ | 1 layer: TPMI = 0; |
| G1 | $\left\{\frac{1}{2}\begin{bmatrix}1\\0\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}10\\00\\01\\00\end{bmatrix}$ | 1 layer: TPMI = 0, TPMI = 2, TPMI = 4, TPMI = 5, TPMI = 6, TPMI = 7; 2 layers: TPMI = 1; |
| G2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}\left\{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\right\}, \frac{1}{2}\begin{bmatrix}100\\010\\001\\000\end{bmatrix}$ | 1 layer: TPMI = 0, TPMI = 1, TPMI = 2, TPMI = 4, TPMI = 5, TPMI = 6, TPMI = 7; 2 layers: TPMI = 1, TPMI = 0, TPMI = 3; 3 layers: TPMI = 0; |
| G3 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}10\\00\\01\\00\end{bmatrix}$ | 1 layer: TPMI = 4, TPMI = 5, TPMI = 6, TPMI = 7; 2 layers: TPMI = 1; |
| G4 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\right\}, \frac{1}{2}\begin{bmatrix}100\\010\\001\\000\end{bmatrix}$ | 1 layer: TPMI = 4, TPMI = 5, TPMI = 6, TPMI = 7; 2 layers: TPMI = 1, TPMI = 0, TPMI = 3; |

TABLE X-continued

Precoding matrix groups and TPMI group(s) thereof for 4 antenna ports
(codebookSubset = "partialAndnonCoherent", ULFPTxModes = "Mode 2")

| index | Precoding Matrices | TPMI(s) |
|---|---|---|
| G5 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$ <br> $\left\{\frac{1}{2}\begin{bmatrix}10\\00\\01\\00\end{bmatrix}, \frac{1}{2}\begin{bmatrix}00\\10\\00\\01\end{bmatrix}, \frac{1}{2}\begin{bmatrix}10\\01\\00\\00\end{bmatrix}, \frac{1}{2}\begin{bmatrix}10\\00\\00\\01\end{bmatrix}, \frac{1}{2}\begin{bmatrix}00\\10\\01\\00\end{bmatrix}, \frac{1}{2}\begin{bmatrix}00\\00\\10\\01\end{bmatrix}\right\}, \frac{1}{2}\begin{bmatrix}100\\010\\001\\000\end{bmatrix}$ | 3 layers: TPMI = 0;<br>1 layer: TPMI = 4,<br>TPMI = 5, TPMI = 6,<br>TPMI = 7, TPMI = 8,<br>TPMI = 9, TPMI = 10,<br>TPMI = 11;<br>2 layers: TPMI = 1,<br>TPMI = 4, TPMI = 0,<br>TPMI = 2, TPMI = 3,<br>TPMI = 5;<br>3 layers: TPMI = 0; |
| G6 | $\frac{1}{2}\begin{bmatrix}1\\0\\0\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}10\\00\\01\\00\end{bmatrix}$ | 3 layers: TPMI = 0;<br>1 layer: TPMI = 0,<br>TPMI = 4, TPMI = 5,<br>TPMI = 6, TPMI = 7;<br>2 layers: TPMI = 1; |
| G7 | $\frac{1}{2}\begin{bmatrix}1\\0\\0\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\right\}, \frac{1}{2}\begin{bmatrix}100\\010\\001\\000\end{bmatrix}$ | 1 layer: TPMI = 0,<br>TPMI = 4, TPMI = 5,<br>TPMI = 6, TPMI = 7;<br>2 layers: TPMI = 1,<br>TPMI = 0, TPMI = 3;<br>3 layers: TPMI = 0; |
| G8 | $\left\{\frac{1}{2}\begin{bmatrix}1\\0\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\right\}, \frac{1}{2}\begin{bmatrix}100\\010\\001\\000\end{bmatrix}$ | 1 layer: TPMI = 0,<br>TPMI = 2, TPMI = 4,<br>TPMI = 5, TPMI = 6,<br>TPMI = 7;<br>2 layers: TPMI = 1,<br>TPMI = 0, TPMI = 3;<br>3 layers: TPMI = 0; |
| G9 | $\frac{1}{2}\begin{bmatrix}1\\0\\0\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$ <br> $\left\{\frac{1}{2}\begin{bmatrix}10\\00\\01\\00\end{bmatrix}, \frac{1}{2}\begin{bmatrix}00\\10\\00\\01\end{bmatrix}, \frac{1}{2}\begin{bmatrix}10\\01\\00\\00\end{bmatrix}, \frac{1}{2}\begin{bmatrix}10\\00\\00\\01\end{bmatrix}, \frac{1}{2}\begin{bmatrix}00\\10\\01\\00\end{bmatrix}, \frac{1}{2}\begin{bmatrix}00\\00\\10\\01\end{bmatrix}\right\}, \frac{1}{2}\begin{bmatrix}100\\010\\001\\000\end{bmatrix}$ | 1 layer: TPMI = 0,<br>TPMI = 4, TPMI = 5,<br>TPMI = 6, TPMI = 7,<br>TPMI = 8, TPMI = 9,<br>TPMI = 10, TPMI = 11;<br>2 layers: TPMI = 1,<br>TPMI = 4, TPMI = 0,<br>TPMI = 2, TPMI = 3,<br>TPMI = 5;<br>3 layers: TPMI = 0; |
| G10 | $\left\{\frac{1}{2}\begin{bmatrix}1\\0\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$ <br> $\left\{\frac{1}{2}\begin{bmatrix}10\\00\\01\\00\end{bmatrix}, \frac{1}{2}\begin{bmatrix}00\\10\\00\\01\end{bmatrix}, \frac{1}{2}\begin{bmatrix}10\\01\\00\\00\end{bmatrix}, \frac{1}{2}\begin{bmatrix}10\\00\\00\\01\end{bmatrix}, \frac{1}{2}\begin{bmatrix}00\\10\\01\\00\end{bmatrix}, \frac{1}{2}\begin{bmatrix}00\\00\\10\\01\end{bmatrix}\right\}, \frac{1}{2}\begin{bmatrix}100\\010\\001\\000\end{bmatrix}$ | 1 layer: TPMI = 0,<br>TPMI = 2, TPMI = 4,<br>TPMI = 5, TPMI = 6,<br>TPMI = 7, TPMI = 8,<br>TPMI = 9, TPMI = 10,<br>TPMI = 11;<br>2 layers: TPMI = 1,<br>TPMI = 4, TPMI = 0,<br>TPMI = 2, TPMI = 3,<br>TPMI = 5;<br>3 layers: TPMI = 0; |
| G11 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}, \frac{1}{2}\begin{bmatrix}0\\0\\0\\1\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$ <br> $\left\{\frac{1}{2}\begin{bmatrix}10\\00\\01\\00\end{bmatrix}, \frac{1}{2}\begin{bmatrix}00\\10\\00\\01\end{bmatrix}, \frac{1}{2}\begin{bmatrix}10\\01\\00\\00\end{bmatrix}, \frac{1}{2}\begin{bmatrix}10\\00\\00\\01\end{bmatrix}, \frac{1}{2}\begin{bmatrix}00\\10\\01\\00\end{bmatrix}, \frac{1}{2}\begin{bmatrix}00\\00\\10\\01\end{bmatrix}\right\}, \frac{1}{2}\begin{bmatrix}100\\010\\001\\000\end{bmatrix}$ | 3 layers: TPMI = 0,<br>TPMI = 1, TPMI = 2,<br>TPMI = 4, TPMI = 5,<br>TPMI = 6, TPMI = 7,<br>TPMI = 8, TPMI = 9,<br>TPMI = 10, TPMI = 11;<br>2 layers: TPMI = 1,<br>TPMI = 4, TPMI = 0,<br>TPMI = 2, TPMI = 3,<br>TPMI = 5;<br>3 layers: TPMI = 0; |

In an embodiment, the precoding matrix group G0 shown in table X may be used for supporting a UE with 4 antenna ports whose PAs are equal to or greater than [23 17 17 17] dBm (e.g. PA=[23 17 17 17] dBm) to perform the UL full power transmission.

In an embodiment, the precoding matrix group G1 shown in table X is used for supporting a UE with 4 antenna ports whose PAs are equal to or greater than [23 17 23 17] dBm (e.g. PA=[23 17 23 17] dBm) to perform the UL full power transmission.

In an embodiment, the precoding matrix group G2 shown in table X is used for supporting a UE with 4 antenna ports whose PAs are equal to or greater than [23 23 23 17] dBm (e.g. PA=[23 23 23 17] dBm) to perform the UL full power transmission.

In an embodiment, the precoding matrix group G3 shown in table X is used for supporting a UE with 4 antenna ports whose PAs are equal to or greater than [20 17 20 17] dBm (e.g. PA=[20 17 20 17] dBm) to perform the UL full power transmission.

In an embodiment, the precoding matrix group G4 shown in table X is used for supporting a UE with 4 antenna ports whose PAs are equal to or greater than [20 20 20 17] dBm (e.g. PA=[20 20 20 17] dBm) to perform the UL full power transmission.

In an embodiment, the precoding matrix group G5 shown in table X is used for supporting a UE with 4 antenna ports whose PAs are equal to or greater than [20 20 20 20] dBm (e.g. PA=[20 20 20 20] dBm) to perform the UL full power transmission.

In an embodiment, the precoding matrix group G6 shown in table X is used for supporting a UE with 4 antenna ports whose PAs are equal to or greater than [23 17 20 17] dBm (e.g. PA=[23 17 20 17] dBm) to perform the UL full power transmission.

In an embodiment, the precoding matrix group G7 shown in table X is used for supporting a UE with 4 antenna ports whose PAs are equal to or greater than [23 20 20 17] dBm (e.g. PA=[23 20 20 17] dBm) to perform the UL full power transmission.

In an embodiment, the precoding matrix group G8 shown in table X is used for supporting a UE with 4 antenna ports whose PAs are equal to or greater than [23 20 23 17] dBm (e.g. PA=[23 20 23 17] dBm) to perform the UL full power transmission.

In an embodiment, the precoding matrix group G9 shown in table X is used for supporting a UE with 4 antenna ports whose PAs are equal to or greater than [23 20 20 20] dBm (e.g. PA=[23 20 20 20] dBm) to perform the UL full power transmission.

In an embodiment, the precoding matrix group G10 shown in table X is used for supporting a UE with 4 antenna ports whose PAs are equal to or greater than [23 20 23 20] dBm (e.g. PA=[23 20 23 20] dBm) to perform the UL full power transmission.

In an embodiment, the precoding matrix group G11 shown in table X is used for supporting a UE with 4 antenna ports whose PAs are equal to or greater than [23 23 23 20] dBm (e.g. PA=[23 23 23 20] dBm) to perform the UL full power transmission.

In tables VIII to X, TPMI group(s) corresponding to each of precoding matrix groups can be acquired by looking up tables I, IV, V and VI, wherein the TPMI of 1 layer indicates the precoding matrix corresponding to the TPMI index in tables I and IV, the TPMI of 2 layers indicates the precoding matrix corresponding to the TPMI index in table V and the TPMI of 3 layers indicates the precoding matrix corresponding to the TPMI index in table VI.

In an embodiment, each of precoding matrix group in tables VIII to X may be regarded as consisting of at least one of basic precoding matrix groups BG1 to BG6 shown in the following table XI. For example, the precoding matrix group G0 shown in table X is the basic precoding matrix group BG0 shown in table XI and the precoding matrix group G1 shown in table X consists of the basic precoding matrix groups BG1 and BG4 shown in table XI.

TABLE XI

Basic precoding matrix group and TPMI group(s) thereof
(codebookSubset = "partialAndNonCoherent", ULFPTxModes = "Mode 2")

| index | Precoding Matrices | TPMI(s) |
|---|---|---|
| BG0 | $\frac{1}{2}\begin{bmatrix}1\\0\\0\\0\end{bmatrix}$ | 1 layer: TPMI = 0; |
| BG1 | $\left\{\frac{1}{2}\begin{bmatrix}1\\0\\0\\0\end{bmatrix}, \frac{1}{2}\begin{bmatrix}0\\0\\1\\0\end{bmatrix}\right\}, \frac{1}{2}\begin{bmatrix}10\\00\\01\\00\end{bmatrix}$ | 1 layer: TPMI = 0, TPMI = 2; 2 layers: TPMI = 1; |
| BG2 | $\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\right\}, \frac{1}{2}\begin{bmatrix}100\\010\\001\\000\end{bmatrix}$ | 1 layer: TPMI = 0, TPMI = 1, TPMI = 2; 2 layers: TPMI = 1, TPMI = 0, TPMI = 3; 3 layers: TPMI = 0; |
| BG3 | $\left\{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\right\}, \frac{1}{2}\begin{bmatrix}100\\010\\001\\000\end{bmatrix}$ | 2 layers: TPMI = 1, TPMI = 0, TPMI = 3; 3 layers: TPMI = 0; |
| BG4 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}10\\00\\01\\00\end{bmatrix}$ | 1 layer: TPMI = 4, TPMI = 5, TPMI = 6, TPMI = 7; 2 layers: TPMI = 1; |

TABLE XI-continued

Basic precoding matrix group and TPMI group(s) thereof
(codebookSubset = "partialAndNonCoherent", ULFPTxModes = "Mode 2")

| index | Precoding Matrices | TPMI(s) |
|---|---|---|
| BG5 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}10\\00\\01\\00\end{bmatrix}, \frac{1}{2}\begin{bmatrix}10\\01\\00\\00\end{bmatrix}, \frac{1}{2}\begin{bmatrix}00\\10\\01\\00\end{bmatrix}\right\}, \frac{1}{2}\begin{bmatrix}100\\010\\001\\000\end{bmatrix}$ | 1 layer: TPMI = 4, TPMI = 5, TPMI = 6, TPMI = 7; 2 layers: TPMI = 1, TPMI = 0, TPMI = 3; |
| BG6 | $\left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$ $\left\{\frac{1}{2}\begin{bmatrix}10\\00\\01\\00\end{bmatrix}, \frac{1}{2}\begin{bmatrix}00\\10\\00\\01\end{bmatrix}, \frac{1}{2}\begin{bmatrix}10\\01\\00\\00\end{bmatrix}, \frac{1}{2}\begin{bmatrix}10\\00\\00\\01\end{bmatrix}, \frac{1}{2}\begin{bmatrix}00\\10\\01\\00\end{bmatrix}, \frac{1}{2}\begin{bmatrix}00\\00\\10\\01\end{bmatrix}\right\}, \frac{1}{2}\begin{bmatrix}100\\010\\001\\000\end{bmatrix}$ | 1 layer: TPMI = 4, TPMI = 5, TPMI = 6, TPMI = 7, TPMI = 8, TPMI = 9, TPMI = 10, TPMI = 11; 2 layers: TPMI = 1, TPMI = 4, TPMI = 0, TPMI = 2, TPMI = 3, TPMI = 5; 3 layers: TPMI = 0; |

In an embodiment, there may be a capability of the codebook based transmission not supporting the full power transmission. In an embodiment, the first communication node may report information of the codebook based transmission not supporting to the second communication node, e.g. when the first communication node has the capability. In an embodiment, the information may be indicated in a full power status indication field or a transmission codebook field of a UL control signaling (e.g. a radio resource control (RRC) signaling).

In an embodiment of the information is indicated by the full power status indication field in the UL control signaling, the UL control signaling comprises a field (i.e. the full power state indication field) configured to indicate a switch of whether the codebook based transmission supports the full power transmission. For example, the switch is turned off (i.e. the codebook based transmission does not support the full power transmission) when the value of the field is 0 and the switch is turned on (i.e. the codebook based transmission supports the full power transmission) when the value of the field is 1.

In an embodiment of the information is indicated by the transmitted codebook field in the UL control signaling, the transmitted codebook filed of the UL control signaling comprises a status (e.g. a value, a code point or an entry of the transmitted codebook field) indicating that the codebook based transmission does not support the full power transmission. That is, the information is indicated by a certain status (e.g. a value, a code point or an entry) of the transmitted codebook filed. In an embodiment, the transmitted codebook field is configured to indicate the precoding matrix group(s). For example, when the parameter codebookSubset is set to partialAndNonCoherent and the parameter ULFPTxModes is set to Mode 2, the transmitted codebook fields having values 0 to 11 respectively indicate the precoding matrix groups G0 to G11 shown in table X and the transmitted codebook fields having values 12 to 15 are reserved. In this example, the transmitted codebook field with the value 15 may be configured as the value (e.g. an entry, a code point) indicating the codebook based transmission does not support the full power transmission. That is, the first communication device may report the capability of the codebook based transmission not supporting the full power transmission via reporting (e.g. transmitting) the transmitted codebook field with the value 15.

In step 104, the first communication node receives at least one configured codeword indicated by (e.g. configured by) the second communication node and performs (UL) transmission(s) according to one of the at least one configured codeword. In an embodiment, the configured codeword used for transmission is determined by the first communication node itself. In an embodiment, the first communication node performs the transmission(s) based on power ratio of one of the at least one configured codeword. In an embodiment, the power ratio for a full power codebook reported by the first communication node is 1. Note that, the at least one configured codeword comprises at least one of the reported codeword(s) (i.e. at least one of precoding matrix group(s) or TPMI group(s) reported from the first communication node to the second communication node).

Embodiment #2

This embodiment provides a wireless communication method for use in a second communication node, wherein the second communication node may be a receiving terminal (e.g. a wireless network node or a BS). More specifically, the wireless communication method comprises the following steps:

In step 200, the second communication node transmits a transmission mode to the first communication node.

In an embodiment, the second communication node configures a transmission mode for the first communication node according to capability information received from the first communication node and transmits the configured transmission mode to the first communication node.

In an embodiment, the step 200 may be omitted. For example, the first communication node may determine the transmission mode itself (e.g. step 100 shown in FIG. 1).

In an embodiment, the transmission mode comprises at least one of:
  a first transmission mode, i.e. Mode 1;
  a second transmission mode, i.e. Mode 2;
  a full power transmission mode; or
  a transmission mode supporting indicating whether a transmitted codeword is in a full power state.

In step 202, the second communication node receives at least one codeword reported by the first communication node.

In step 204, the second communication node indicates (e.g. transmits or configures), to the first communication node, at least one configured codeword for (subsequent) transmission(s).

In an embodiment, the codeword(s) reported by the first communication node and the codeword(s) indicated by the second communication node for the transmission are similar to those shown in the embodiment #1 and are not described herein for brevity.

In an embodiment, the second communication node utilizes one of the at least one configured codeword to perform transmission(s) with the first communication node (e.g. to receive transmission(s) from the first communication node). In an embodiment, the second communication perform the transmission(s) based on power ratio of one of the at least one configured codeword. In an embodiment, the power ratio for a full power codebook reported by the first communication node is 1.

In embodiment #2, the second communication node receives the transmission(s) performed based on one of the at least one configured codeword from the first communication node, wherein the configured codeword used for the transmission(s) is determined by the first communication node according to the transmission mode of the first communication node. As a result, the transceiving performance of the antennas can be enhanced, the signaling overhead is reduced and the university is increased by supporting communication nodes of various types.

In an embodiment, the present disclosure further provides a transmission device, which comprises a processor configured to perform a computer program for achieving the communication methods of aforementioned embodiment. More specifically, the transmission device may be the first communication node or the second communication node in the aforementioned embodiments, and is not limited herein.

The following embodiments separately disclose the transmission devices being the BS and UE.

Figure 3:
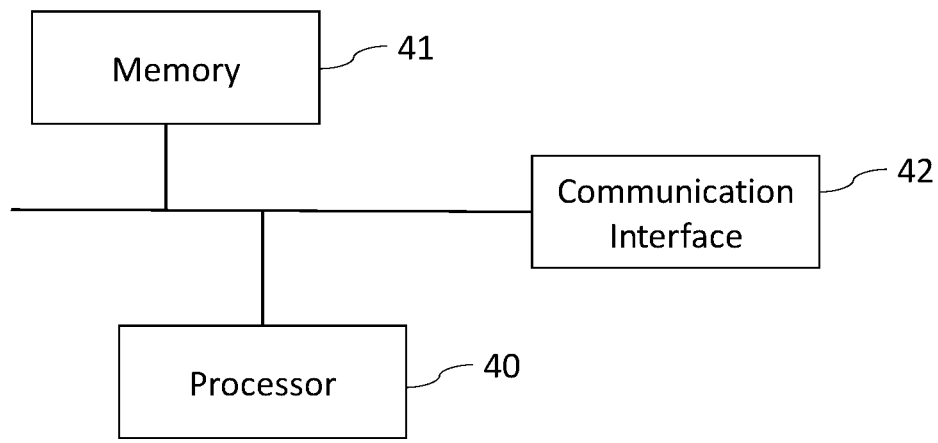
FIG. 3 shows a schematic diagram of a base station according to an embodiment of the present disclosure.

FIG. 3 shows a schematic diagram of a BS according to an embodiment of the present disclosure. As shown in FIG. 3, the BS comprises a processor 40, a memory 41 and a communication interface 42. In an embodiment, the processor 40 may be implemented by one or more processors and FIG. 3 shows single processor as an example. In FIG. 3, the processor 40, the memory 41 and the communication interface 42 are connected via bus(es) as an example for illustrations and may be connected by other methods. Note that, the bus(es) may be realized by one or more bus structures, such as storage bus, storage controller, peripheral bus, accelerated graphics port, processor or local bus of using any of multiple bus structures.

In an embodiment, the memory 41 is a computer readable storage medium, configured to storage software programs, computer executable programs and modules (e.g. program instructions/modules corresponding to the communication methods of the present disclosure). Via executing the software programs, instructions and modules stored in the memory 41, the processor 40 performs at least one functional application and data processing, i.e. implementing the aforementioned transmission methods.

The memory 41 may comprise a program storage block and a data storage block, wherein the program storage block is configured to store application programs required by an operation system and/or at least one function and the data storage block is configured to store data generated during operations of the terminal. In addition, the memory 41 may comprise high speed random access memory and may further comprise non-volatile memory, such as at least one disk storage component, flash storage component or other non-volatile solid state memory. In an embodiment, the memory 41 may comprise memory remotely configured to the processor 40 and the memory may connect to the BS via network. Note that, the network may comprise Internet, intranet, local network, mobile network and combinations thereof and is not limited herein.

The communication interface 42 is configured to receive and transmit data.

Figure 4:
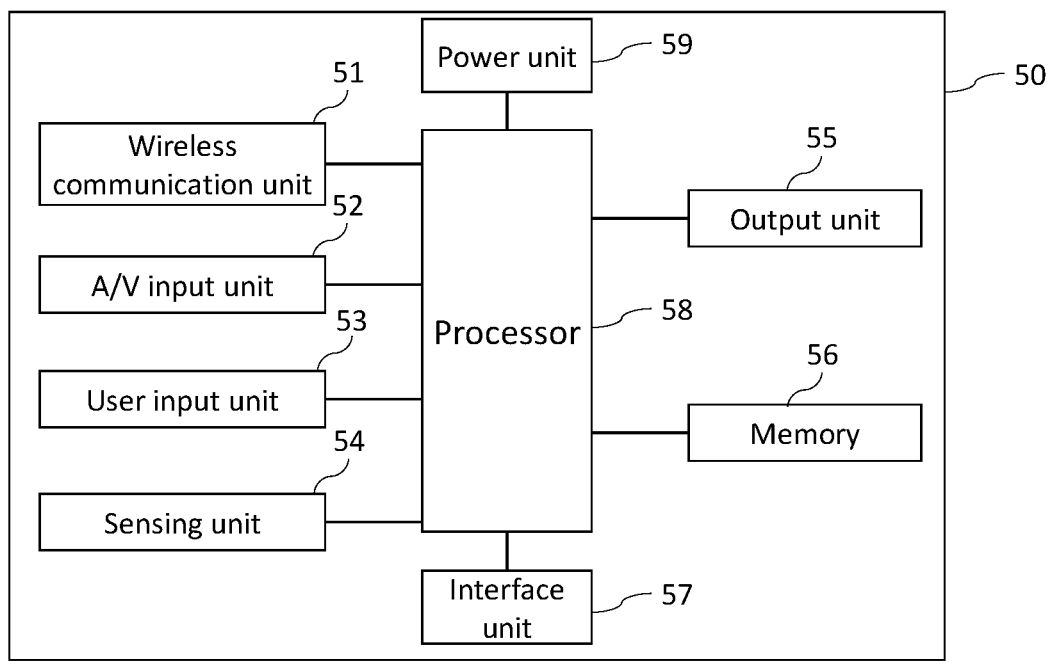
FIG. 4 shows a schematic diagram of a user equipment according to an embodiment of the present disclosure.

FIG. 4 shows a schematic diagram of a UE 50 according to an embodiment of the present disclosure. The UE may be implemented by various forms. In the present disclosure, the UE may comprise a portable terminal device, such as a mobile phone, a smart phone, a personal digital assistant (PDA), a tablet, a portable media player (PMP), a navigation device, a vehicle terminal device, a vehicle display terminal a vehicle electronic rearview mirror, etc., and a fixed terminal device, such as digital television (TV), desktop computer, etc.

As shown in FIG. 4, the UE 50 comprises a wireless communication unit 51, an audio/video (A/V) input unit 52, a user input unit 53, a sensing unit 54, an output unit 55, a memory 56, an interface unit 57, a processor 58 and a power unit 59. FIG. 4 shows a UE comprising multiple components. However, skilled person in the art should acknowledge that some of the components shown in FIG. 4 may be optional in a UE and that a UE may be alternatively implemented by more or less components.

In an embodiment, the wireless communication unit 51 allows the UE 50 to perform wireless communications with a BS or a network. The A/V input unit 52 is configured to receive sound or video signals. The user input unit 53 may generate key-in data according to commands inputted by a user, to accordingly control multiple operations of the UE 50. The sensing unit 54 is configured to detect a current status of the UE 50, a location of the UE 50, whether there is a touch input from the user to the UE 50, an orientation of the UE 50, accelerated or deaccelerated movement or direction of the UE 50, etc., and to accordingly generate a command or signal used for controlling the UE 50. The interface unit 57 is configured as an interface of a connected between an external device and the UE 50. The output unit is constructed to output signals in forms of visions, sounds and/or touches. The memory 56 is configured to store software programs executed by the processor 58 for processing or controlling operations or store data having been outputted or to be outputted. The memory 56 may comprise at least one type of storage medium. Moreover, the UE 50 may cooperate with a network storage device performing the storage function of the memory 56 via the network. The processor 58 generally controls overall operations of the UE 50. The power unit 59 is configured to receive external power or internal power under processor 58's controls and provide appropriate power for operating multiple components.

Via executing the programs stored in the memory 56, the processor 58 performs at least one functional application and data processing, e.g., to implement the communication methods of the aforementioned embodiments.

The present disclosure further discloses a computer readable storage medium, configured to store computer programs, implementing the communication methods of the aforementioned embodiments when being executed by a processor.

The computer storage medium may adopt an arbitrary combination of one or more computer readable mediums, wherein the computer readable mediums may be computer readable signal mediums or computer readable storage mediums. In an embodiment, the computer readable storage mediums may be systems, device or components of electricity, magnetic, light, electromagnetic, infrared or semiconductor or combinations thereof. The computer readable storage medium comprises electrical connections with one or more wires, portable computer disk, hard drive, random access memory (RAM), read-only memory (ROM), electrically erasable, programmable ROM (EPROM), flash drive, optical cable, portable compact disc ROM, CD-ROM, optical storage component, magnetic storage component, or combinations thereof. In present disclosure, the computer readable storage medium may be any tangible medium comprising or storing the programs, which may be used by instructions executing systems, devices, components or combinations thereof.

The computer readable signal medium may comprise data signal transmitted as a part of carrier or in based band and the data signal carries the computer readable program codes. The transmitted data signal may comprise various types, such as electromagnetic signal, light signal or a combination thereof. The computer readable signal medium may be any computer readable medium except for the computer readable storage medium and may be able to send, broadcast or transmit the program used by instruction execution systems, devices, components or combinations thereof.

The program codes stored in the computer readable medium may be transmitted by any suitable medium, such as wireless, wire, optical cable, radio frequency or a combination thereof.

In an embodiment, one or more programming languages or a combination of multiple programing languages may be utilized for compiling the program codes executed for performing operations in the present disclosure. The programming languages comprise objected-oriented programming languages, such as Java, Smalltalk, C++, Ruby, Go and further comprise regular procedural programming languages, e.g. C programming language or the similar. The programming codes may be completely executed on the user computer, partly executed on the user computer, executed as an independent software package, party executed on the user computer and partly executed on remote computer, or completely executed on remote computer or server. In the embodiments related to the remote computer, the remote computer may be connected to the user computer via any type of internet, e.g. local area network (LAN) or wide area network (WAN) or connected to external computers (e.g. connected to internet service provider via internet).

Skilled person in the art should acknowledge that terminology "user terminal" covers wireless UE of any appropriate types, such as a mobile phone, a portable data processing device, a portable network browser or a vehicle mobile station.

Generally speaking, various embodiments of the present disclosure may be implemented in hardware, dedicated circuit, software, logics or combination thereof. For example, some aspects may be implemented in the hardware and other aspects may be implemented in firmware or software executed by controller, microprocessor or other computing devices.

The embodiments of the present disclosure may be implemented by a data processor of a mobile device executing computer program instructions, e.g. in the processor entity, by hardware or by a combination of software and hardware. The computer program instructions may be compiled instructions, instruction set architecture (ISA) instructions, machine instructions, machine related instructions, microcode, firmware instructions, state setting data, or source codes or target codes compiled by a combination of one or more program languages.

In figures of the present disclosure, any block may represent program step(s), logic circuit(s), module(s) and functions connected with each other, or a combination of the program step(s) and logic circuit(s), module(s) and functions connected with each other. The computer program may be stored on memory, which may be implemented by any type of memory suitable for local technical environment and any appropriate data storage technology. For example, the memory may comprise read only memory (ROM), random access memory (RAM), a light storage device and system (e.g. digital versatile disc or compact disk (CD)), etc., and is not limited herein. In an embodiment, the computer readable medium may also comprise non-transitory storage medium. The data processor may be any type of processor suitable for local technical environment. For example, the data processor may be a general computer, a dedicated computer, a microprocessor, a digital signal processor (DSP), an application specific integrated circuit (ASIC), a field-programmable gate array (FPGA) or a multi-cores architecture based processor, and is not limited herein.

What is claimed is:

1. A wireless communication method for a wireless terminal, comprising:
   determining a transmission mode of the wireless terminal, the transmission mode indicated from a wireless network node and comprising at least one of:
   a first transmission mode,
   a second transmission mode,
   a full power transmission mode, or
   a transmission mode supporting indicating whether a transmitted codeword is in a full power state;
   reporting, to the wireless network node, at least one precoding matrix group of at least one codeword according to the transmission mode;
   receiving, from the wireless network node, at least one codeword which is reported by the wireless terminal; and
   performing a transmission based on a power ratio of one of the at least one codeword;
   wherein the at least one precoding matrix group comprises at least one of at least one Transmitted Precoding Matrix Indicator (TPMI) group, wherein the at least one TPMI group comprises:

$$G8: \left\{ \frac{1}{2}\begin{bmatrix}1\\0\\0\\0\end{bmatrix}, \frac{1}{2}\begin{bmatrix}0\\0\\1\\0\end{bmatrix} \right\}, \left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\}, \frac{1}{2}\begin{bmatrix}1&0\\0&0\\0&1\\0&0\end{bmatrix};$$

$$G9: \frac{1}{2}\begin{bmatrix}1\\0\\0\\0\end{bmatrix}, \left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\},$$

$$\left\{ \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix} \right\}, \frac{1}{2}\begin{bmatrix}1&0&0\\0&1&0\\0&0&1\\0&0&0\end{bmatrix};$$

$$G10: \left\{ \frac{1}{2}\begin{bmatrix}1\\0\\0\\0\end{bmatrix}, \frac{1}{2}\begin{bmatrix}0\\0\\1\\0\end{bmatrix} \right\}, \left\{ \frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix} \right\},$$

$$\left\{ \frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix} \right\}, \frac{1}{2}\begin{bmatrix}1&0&0\\0&1&0\\0&0&1\\0&0&0\end{bmatrix};$$

-continued $$G11: \left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1\\1\\0\\0\end{bmatrix}, \frac{1}{2}\begin{bmatrix}1\\-1\\0\\0\end{bmatrix}, \frac{1}{2}\begin{bmatrix}1\\j\\0\\0\end{bmatrix}, \frac{1}{2}\begin{bmatrix}1\\-j\\0\\0\end{bmatrix}\right\},$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$G13: \left\{\frac{1}{2}\begin{bmatrix}1\\0\\0\\0\end{bmatrix}, \frac{1}{2}\begin{bmatrix}0\\1\\0\\0\end{bmatrix}\right\}, \left\{\frac{1}{2}\begin{bmatrix}1\\1\\0\\0\end{bmatrix}, \frac{1}{2}\begin{bmatrix}1\\-1\\0\\0\end{bmatrix}, \frac{1}{2}\begin{bmatrix}1\\j\\0\\0\end{bmatrix}, \frac{1}{2}\begin{bmatrix}1\\-j\\0\\0\end{bmatrix}\right\},$$

$$\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$$

$$\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$$

$$\frac{1}{2}\begin{bmatrix}1&0&0\\0&1&0\\0&0&1\\0&0&0\end{bmatrix}; \text{ and}$$

$$G14: \left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1\\1\\0\\0\end{bmatrix}, \frac{1}{2}\begin{bmatrix}1\\-1\\0\\0\end{bmatrix}, \frac{1}{2}\begin{bmatrix}1\\j\\0\\0\end{bmatrix}, \frac{1}{2}\begin{bmatrix}1\\-j\\0\\0\end{bmatrix}\right\},$$

$$\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$$

$$\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$$

$$\frac{1}{2}\begin{bmatrix}1&0&0\\0&1&0\\0&0&1\\0&0&0\end{bmatrix}, \text{ or}$$

the at least one TPMI group comprises:

$$G1: \left\{\frac{1}{2}\begin{bmatrix}1\\0\\0\\0\end{bmatrix}, \frac{1}{2}\begin{bmatrix}0\\1\\0\\0\end{bmatrix}\right\}, \left\{\frac{1}{2}\begin{bmatrix}1\\1\\0\\0\end{bmatrix}, \frac{1}{2}\begin{bmatrix}1\\-1\\0\\0\end{bmatrix}, \frac{1}{2}\begin{bmatrix}1\\j\\0\\0\end{bmatrix}, \frac{1}{2}\begin{bmatrix}1\\-j\\0\\0\end{bmatrix}\right\}, \frac{1}{2}\begin{bmatrix}1&0\\0&0\\0&1\\0&0\end{bmatrix};$$

$$G2: \left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1\\1\\0\\0\end{bmatrix}, \frac{1}{2}\begin{bmatrix}1\\-1\\0\\0\end{bmatrix}, \frac{1}{2}\begin{bmatrix}1\\j\\0\\0\end{bmatrix}, \frac{1}{2}\begin{bmatrix}1\\-j\\0\\0\end{bmatrix}\right\},$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$G4: \left\{\frac{1}{2}\begin{bmatrix}1\\1\\0\\0\end{bmatrix}, \frac{1}{2}\begin{bmatrix}1\\-1\\0\\0\end{bmatrix}, \frac{1}{2}\begin{bmatrix}1\\j\\0\\0\end{bmatrix}, \frac{1}{2}\begin{bmatrix}1\\-j\\0\\0\end{bmatrix}\right\},$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$G7: \frac{1}{2}\begin{bmatrix}1\\0\\0\\0\end{bmatrix}, \left\{\frac{1}{2}\begin{bmatrix}1\\1\\0\\0\end{bmatrix}, \frac{1}{2}\begin{bmatrix}1\\-1\\0\\0\end{bmatrix}, \frac{1}{2}\begin{bmatrix}1\\j\\0\\0\end{bmatrix}, \frac{1}{2}\begin{bmatrix}1\\-j\\0\\0\end{bmatrix}\right\},$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$G8: \left\{\frac{1}{2}\begin{bmatrix}1\\0\\0\\0\end{bmatrix}, \frac{1}{2}\begin{bmatrix}0\\1\\0\\0\end{bmatrix}\right\}, \left\{\frac{1}{2}\begin{bmatrix}1\\1\\0\\0\end{bmatrix}, \frac{1}{2}\begin{bmatrix}1\\-1\\0\\0\end{bmatrix}, \frac{1}{2}\begin{bmatrix}1\\j\\0\\0\end{bmatrix}, \frac{1}{2}\begin{bmatrix}1\\-j\\0\\0\end{bmatrix}\right\},$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$G10: \left\{\frac{1}{2}\begin{bmatrix}1\\0\\0\\0\end{bmatrix}, \frac{1}{2}\begin{bmatrix}0\\1\\0\\0\end{bmatrix}\right\}, \left\{\frac{1}{2}\begin{bmatrix}1\\1\\0\\0\end{bmatrix}, \frac{1}{2}\begin{bmatrix}1\\-1\\0\\0\end{bmatrix}, \frac{1}{2}\begin{bmatrix}1\\j\\0\\0\end{bmatrix}, \frac{1}{2}\begin{bmatrix}1\\-j\\0\\0\end{bmatrix}\right\},$$

$$\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$$

$$\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$$

$$\frac{1}{2}\begin{bmatrix}1&0&0\\0&1&0\\0&0&1\\0&0&0\end{bmatrix}; \text{ and}$$

$$G11: \left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1\\1\\0\\0\end{bmatrix}, \frac{1}{2}\begin{bmatrix}1\\-1\\0\\0\end{bmatrix}, \frac{1}{2}\begin{bmatrix}1\\j\\0\\0\end{bmatrix}, \frac{1}{2}\begin{bmatrix}1\\-j\\0\\0\end{bmatrix}\right\},$$

$$\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\}, \left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}\right\},$$

$$\left\{\frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\}, \frac{1}{2}\begin{bmatrix}1&0&0\\0&1&0\\0&0&1\\0&0&0\end{bmatrix}.$$

2. The wireless communication method of claim 1, wherein the transmission mode is the second transmission mode, which indicates at least one codeword supports full power transmission.

3. The wireless communication method of claim 1, wherein the power ratio for a full power codebook reported by the wireless terminal is 1.

4. The wireless communication method of claim 1, wherein the number of antenna ports configured for the transmission or the number of antenna ports configured for sounding reference signal, SRS, resources of the transmission is 4.

5. The wireless communication method of claim 1, wherein a coherent capability of antenna ports configured for the transmission is non-coherent or partial-coherent.

6. The wireless communication method of claim 1, wherein a codeword is a precoder or a precoding matrix.

7. The wireless communication method of claim 1, wherein the at least one precoding matrix group is transmitted by transmitting at least one transmitted precoding matrix indicator (TPMI) group corresponding to the at least one precoding matrix group.

8. The wireless communication method of claim 1,
G8: 1 precoding layer: TPMI index=0, TPMI index=2, TPMI index=4, TPMI index=5, TPMI index=6, TPMI index=7,
2 precoding layers: TPMI index=1;
G9: 1 precoding layer: TPMI index=0, TPMI index=4, TPMI index=5, TPMI index=6, TPMI index=7,
2 precoding layers: TPMI index=1, TPMI index=0, TPMI index=3,
3 precoding layers: TPMI index=0;
G10: 1 precoding layer: TPMI index=0, TPMI index=2, TPMI index=4, TPMI index=5, TPMI index=6, TPMI index=7,
2 precoding layers: TPMI index=1, TPMI index=0, TPMI index=3,
3 precoding layers: TPMI index=0;
G11: 1 precoding layer: TPMI index=0, TPMI index=1, TPMI index=2, TPMI index=4, TPMI index=5, TPMI index=6, TPMI index=7,
2 precoding layers: TPMI index=1, TPMI index=0, TPMI index=3,
3 precoding layers: TPMI index=0;
G13: 1 precoding layer: TPMI index=0, TPMI index=2, TPMI index=4, TPMI index=5, TPMI index=6, TPMI index=7, TPMI index=8, TPMI index=9, TPMI index=10, TPMI index=11,
2 precoding layers: TPMI index=1, TPMI index=4, TPMI index=0, TPMI index=2, TPMI index=3, TPMI index=5,
3 precoding layers: TPMI index=0; and
G14: 1 precoding layer: TPMI index=0, TPMI index=1, TPMI index=2, TPMI index=4, TPMI index=5, TPMI index=6, TPMI index=7, TPMI index=8, TPMI index=9, TPMI index=10, TPMI index=11,
2 precoding layers: TPMI index=1, TPMI index=4, TPMI index=0, TPMI index=2, TPMI index=3, TPMI index=5,
3 precoding layers: TPMI index=0, or
the at least one TPMI group is indicated by:
G1: 1 precoding layer: TPMI index=0, TPMI index=2, TPMI index=4, TPMI index=5, TPMI index=6, TPMI index=7,
2 precoding layers: TPMI index=1;
G2: 1 precoding layer: TPMI index=0, TPMI index=1, TPMI index=2, TPMI index=4, TPMI index=5, TPMI index=6, TPMI index=7,
2 precoding layers: TPMI index=1, TPMI index=0, TPMI index=3,
3 precoding layers: TPMI index=0;
G4: 1 precoding layer: TPMI index=4, TPMI index=5, TPMI index=6, TPMI index=7,
2 precoding layers: TPMI index=1, TPMI index=0, TPMI index=3,
3 precoding layers: TPMI index=0;
G7: 1 precoding layer: TPMI index=0, TPMI index=4, TPMI index=5, TPMI index=6, TPMI index=7,
2 precoding layers: TPMI index=1, TPMI index=0, TPMI index=3,
3 precoding layers: TPMI index=0;
G8: 1 precoding layer: TPMI index=0, TPMI index=2, TPMI index=4, TPMI index=5, TPMI index=6, TPMI index=7,
2 precoding layers: TPMI index=1, TPMI index=0, TPMI index=3,
3 precoding layers: TPMI index=0;
G10: 1 layer: TPMI index=0, TPMI index=2, TPMI index=4, TPMI index=5, TPMI index=6, TPMI index=7, TPMI index=8, TPMI index=9, TPMI index=10, TPMI index=11,
2 precoding layers: TPMI index=1, TPMI index=4, TPMI index=0, TPMI index=2, TPMI index=3, TPMI index=5,
3 precoding layers: TPMI index=0; and
G11: 1 precoding layer: TPMI index=0, TPMI index=1, TPMI index=2, TPMI index=4, TPMI index=5, TPMI index=6, TPMI index=7, TPMI index=8, TPMI index=9, TPMI index=10, TPMI index=11,
2 precoding layers: TPMI index=1, TPMI index=4, TPMI index=0, TPMI index=2, TPMI index=3, TPMI index=5,
3 precoding layers: TPMI index=0.

9. A wireless communication method for use in a wireless network node, comprising:
transmitting, to a wireless terminal, a transmission mode comprising at least one of:
a first transmission mode,
a second transmission mode,
a full power transmission mode, or
a transmission mode supporting indicating whether a transmitted codeword is in a full power state;
receiving, from the wireless terminal, at least one precoding matrix group of at least one codeword;
transmitting, to the wireless terminal, at least one configured codeword; and
performing a reception based on a power ratio of one of the at least one configured codeword;
wherein the at least one precoding matrix group comprises at least one of at least one Transmitted Precoding Matrix Indicator (TPMI) group;
wherein the at least one TPMI group comprises:

$$\left\{\frac{1}{2}\begin{bmatrix}1\\1\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}1&0\\0&0\\0&1\\0&0\end{bmatrix}; \quad \text{G8}$$

$$\frac{1}{2}\begin{bmatrix}1\\0\\0\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \quad \text{G9}$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix}; \quad$$

$$\left\{\frac{1}{2}\begin{bmatrix}1\\1\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \quad \text{G10}$$

-continued $$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0\\0&1\\0&0\\0&0&1\\0&0&0\end{bmatrix};$$

$$\left\{\frac{1}{2}\begin{bmatrix}1\\0\\0\\0\end{bmatrix},\frac{1}{2}\begin{bmatrix}0\\1\\0\\0\end{bmatrix},\frac{1}{2}\begin{bmatrix}0\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$ G11

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$\left\{\frac{1}{2}\begin{bmatrix}1\\0\\0\\0\end{bmatrix},\frac{1}{2}\begin{bmatrix}0\\1\\0\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$ G13

$$\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\},$$

$$\left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix},\frac{1}{2}\begin{bmatrix}1&0\\0&1\\0&0\\0&0\end{bmatrix},\frac{1}{2}\begin{bmatrix}1&0\\0&0\\0&0\\0&1\end{bmatrix},\frac{1}{2}\begin{bmatrix}0&0\\1&0\\0&1\\0&0\end{bmatrix},\frac{1}{2}\begin{bmatrix}0&0\\0&0\\1&0\\0&1\end{bmatrix}\right\},$$

$$\frac{1}{2}\begin{bmatrix}1&0&0\\0&1&0\\0&0&1\\0&0&0\end{bmatrix};\text{ and}$$

$$\left\{\frac{1}{2}\begin{bmatrix}1\\0\\0\\0\end{bmatrix},\frac{1}{2}\begin{bmatrix}0\\1\\0\\0\end{bmatrix},\frac{1}{2}\begin{bmatrix}0\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$ G14

$$\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\},$$

$$\left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix},\frac{1}{2}\begin{bmatrix}1&0\\0&1\\0&0\\0&0\end{bmatrix},\frac{1}{2}\begin{bmatrix}1&0\\0&0\\0&0\\0&1\end{bmatrix},\frac{1}{2}\begin{bmatrix}0&0\\1&0\\0&1\\0&0\end{bmatrix},\frac{1}{2}\begin{bmatrix}0&0\\0&0\\1&0\\0&1\end{bmatrix}\right\},$$

$$\frac{1}{2}\begin{bmatrix}1&0&0\\0&1&0\\0&0&1\\0&0&0\end{bmatrix},\text{ or}$$

the at least one TPMI group comprises:

$$\left\{\frac{1}{2}\begin{bmatrix}1\\0\\0\\0\end{bmatrix},\frac{1}{2}\begin{bmatrix}0\\1\\0\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},\frac{1}{2}\begin{bmatrix}1&0\\0&0\\0&1\\0&0\end{bmatrix};$$ G1

$$\left\{\frac{1}{2}\begin{bmatrix}1\\0\\0\\0\end{bmatrix},\frac{1}{2}\begin{bmatrix}0\\1\\0\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$ G2

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$ G4

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$\frac{1}{2}\begin{bmatrix}1\\0\\0\\0\end{bmatrix};\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},$$ G7

$$\frac{1}{2}\begin{bmatrix}1&0&0\\0&1&0\\0&0&1\\0&0&0\end{bmatrix};$$

$$\left\{\frac{1}{2}\begin{bmatrix}1\\0\\0\\0\end{bmatrix},\frac{1}{2}\begin{bmatrix}0\\1\\0\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$ G8

$$\left\{\frac{1}{2}\begin{bmatrix}1&0\\0&0\\0&1\\0&0\end{bmatrix},\frac{1}{2}\begin{bmatrix}1&0\\0&1\\0&0\\0&0\end{bmatrix},\frac{1}{2}\begin{bmatrix}0&0\\1&0\\0&1\\0&0\end{bmatrix}\right\},\frac{1}{2}\begin{bmatrix}1&0&0\\0&1&0\\0&0&1\\0&0&0\end{bmatrix};$$

$$\left\{\frac{1}{2}\begin{bmatrix}1\\0\\0\\0\end{bmatrix},\frac{1}{2}\begin{bmatrix}0\\1\\0\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$ G10

$$\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\},$$

$$\left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix},\frac{1}{2}\begin{bmatrix}1&0\\0&1\\0&0\\0&0\end{bmatrix},\frac{1}{2}\begin{bmatrix}1&0\\0&0\\0&0\\0&1\end{bmatrix},\frac{1}{2}\begin{bmatrix}0&0\\1&0\\0&1\\0&0\end{bmatrix},\frac{1}{2}\begin{bmatrix}0&0\\0&0\\1&0\\0&1\end{bmatrix}\right\},$$

$$\frac{1}{2}\begin{bmatrix}1&0&0\\0&1&0\\0&0&1\\0&0&0\end{bmatrix};\text{ and}$$

$$\left\{\frac{1}{2}\begin{bmatrix}1\\0\\0\\0\end{bmatrix},\frac{1}{2}\begin{bmatrix}0\\1\\0\\0\end{bmatrix},\frac{1}{2}\begin{bmatrix}0\\0\\1\\0\end{bmatrix}\right\},\left\{\frac{1}{2}\begin{bmatrix}1\\0\\1\\0\end{bmatrix},\frac{1}{2}\begin{bmatrix}1\\0\\-1\\0\end{bmatrix},\frac{1}{2}\begin{bmatrix}1\\0\\j\\0\end{bmatrix},\frac{1}{2}\begin{bmatrix}1\\0\\-j\\0\end{bmatrix}\right\},$$ G11

$$\left\{\frac{1}{2}\begin{bmatrix}0\\1\\0\\1\end{bmatrix},\frac{1}{2}\begin{bmatrix}0\\1\\0\\-1\end{bmatrix},\frac{1}{2}\begin{bmatrix}0\\1\\0\\j\end{bmatrix},\frac{1}{2}\begin{bmatrix}0\\1\\0\\-j\end{bmatrix}\right\},\left\{\frac{1}{2}\begin{bmatrix}1&0\\0&0\\0&1\\0&0\end{bmatrix},\frac{1}{2}\begin{bmatrix}0&0\\1&0\\0&0\\0&1\end{bmatrix}\right\},$$

$$\frac{1}{2}\begin{bmatrix}1&0\\0&1\\0&0\\0&0\end{bmatrix},\frac{1}{2}\begin{bmatrix}1&0\\0&0\\0&0\\0&1\end{bmatrix},\frac{1}{2}\begin{bmatrix}0&0\\1&0\\0&1\\0&0\end{bmatrix},\frac{1}{2}\begin{bmatrix}0&0\\0&0\\1&0\\0&1\end{bmatrix},\frac{1}{2}\begin{bmatrix}1&0&0\\0&1&0\\0&0&1\\0&0&0\end{bmatrix}.$$

10. A wireless terminal, comprising:
at least one processor; and
a memory, which is configured to store at least one program;

wherein the at least one program, when executed by the at least one processor, enables the at least one processor to perform operations comprising:
  determining a transmission mode of the wireless terminal, the transmission mode indicated from a wireless network node and comprising at least one of:
    a first transmission mode,
    a second transmission mode,
    a full power transmission mode, or
    a transmission mode supporting indicating whether a transmitted codeword is in a full power state;
  reporting, to the wireless network node, at least one precoding matrix group of at least one codeword according to a transmission mode; and
  receiving, from the wireless network node, at least one configured codeword; and
  performing a transmission based on power ratio of one of the at least one configured codeword;
wherein the at least one precoding matrix group comprises at least one of at least one Transmitted Precoding Matrix Indicator (TPMI) group, wherein the at least one TPMI group comprises:

$$\left\{\frac{1}{2}\begin{bmatrix}1\\0\\0\\0\end{bmatrix}, \frac{1}{2}\begin{bmatrix}0\\1\\0\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}1&0\\0&0\\0&1\\0&0\end{bmatrix}; \quad G8$$

$$\frac{1}{2}\begin{bmatrix}1\\0\\0\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \quad G9$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$\left\{\frac{1}{2}\begin{bmatrix}1\\0\\0\\0\end{bmatrix}, \frac{1}{2}\begin{bmatrix}0\\1\\0\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \quad G10$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \quad G11$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$\left\{\frac{1}{2}\begin{bmatrix}1\\0\\0\\0\end{bmatrix}, \frac{1}{2}\begin{bmatrix}0\\1\\0\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \quad G13$$

$$\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$$

$$\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$$

$$\frac{1}{2}\begin{bmatrix}1&0&0\\0&1&0\\0&0&1\\0&0&0\end{bmatrix}; \text{ and} \quad G14$$

$$\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\},$$

$$\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$$

$$\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$$

$$\frac{1}{2}\begin{bmatrix}1&0&0\\0&1&0\\0&0&1\\0&0&0\end{bmatrix}, \text{ or}$$

the at least one TPMI group comprises:

$$\left\{\frac{1}{2}\begin{bmatrix}1\\0\\0\\0\end{bmatrix}, \frac{1}{2}\begin{bmatrix}0\\1\\0\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}1&0\\0&0\\0&1\\0&0\end{bmatrix}; \quad G1$$

$$\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \quad G2$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$\left\{\frac{1}{2}\begin{bmatrix}1\\1\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \quad G4$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$\frac{1}{2}\begin{bmatrix}1\\0\\0\\0\end{bmatrix}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \quad G7$$

$$\frac{1}{2}\begin{bmatrix}1&0&0\\0&1&0\\0&0&1\\0&0&0\end{bmatrix};$$

$$\left\{\frac{1}{2}\begin{bmatrix}1\\0\\0\\0\end{bmatrix}, \frac{1}{2}\begin{bmatrix}0\\1\\0\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \quad G8$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

-continued $$G10 \quad \left\{ \begin{bmatrix} 1\\1\\0\\0 \end{bmatrix}, \frac{1}{2}\begin{bmatrix} 0\\0\\1\\0 \end{bmatrix} \right\}, \left\{ \frac{1}{2}\begin{bmatrix} 1\\1\\0\\0 \end{bmatrix}, \frac{1}{2}\begin{bmatrix} 1\\0\\1\\0 \end{bmatrix}, \frac{1}{2}\begin{bmatrix} 1\\0\\-1\\0 \end{bmatrix}, \frac{1}{2}\begin{bmatrix} 1\\0\\j\\0 \end{bmatrix}, \frac{1}{2}\begin{bmatrix} 1\\0\\-j\\0 \end{bmatrix} \right\},$$

$$\left\{ \frac{1}{2}\begin{bmatrix} 0\\1\\0\\1 \end{bmatrix}, \frac{1}{2}\begin{bmatrix} 0\\1\\0\\-1 \end{bmatrix}, \frac{1}{2}\begin{bmatrix} 0\\1\\0\\j \end{bmatrix}, \frac{1}{2}\begin{bmatrix} 0\\1\\0\\-j \end{bmatrix} \right\},$$

$$\left\{ \frac{1}{2}\begin{bmatrix} 1 & 0\\0 & 0\\0 & 1\\0 & 0 \end{bmatrix}, \frac{1}{2}\begin{bmatrix} 0 & 0\\1 & 0\\0 & 0\\0 & 1 \end{bmatrix}, \frac{1}{2}\begin{bmatrix} 1 & 0\\0 & 1\\0 & 0\\0 & 0 \end{bmatrix}, \frac{1}{2}\begin{bmatrix} 1 & 0\\0 & 0\\0 & 0\\0 & 1 \end{bmatrix}, \frac{1}{2}\begin{bmatrix} 0 & 0\\1 & 0\\0 & 1\\0 & 0 \end{bmatrix}, \frac{1}{2}\begin{bmatrix} 0 & 0\\0 & 1\\1 & 0\\0 & 1 \end{bmatrix} \right\},$$

$$\frac{1}{2}\begin{bmatrix} 1 & 0 & 0\\0 & 1 & 0\\0 & 0 & 1\\0 & 0 & 0 \end{bmatrix}; \text{ and}$$

$$G11 \quad \left\{ \frac{1}{2}\begin{bmatrix} 1\\0\\0\\0 \end{bmatrix}, \frac{1}{2}\begin{bmatrix} 0\\1\\0\\0 \end{bmatrix}, \frac{1}{2}\begin{bmatrix} 0\\0\\1\\0 \end{bmatrix} \right\}, \left\{ \frac{1}{2}\begin{bmatrix} 1\\0\\1\\0 \end{bmatrix}, \frac{1}{2}\begin{bmatrix} 1\\0\\-1\\0 \end{bmatrix}, \frac{1}{2}\begin{bmatrix} 1\\0\\j\\0 \end{bmatrix}, \frac{1}{2}\begin{bmatrix} 1\\0\\-j\\0 \end{bmatrix} \right\},$$

$$\left\{ \frac{1}{2}\begin{bmatrix} 0\\1\\0\\1 \end{bmatrix}, \frac{1}{2}\begin{bmatrix} 0\\1\\0\\-1 \end{bmatrix}, \frac{1}{2}\begin{bmatrix} 0\\1\\0\\j \end{bmatrix}, \frac{1}{2}\begin{bmatrix} 0\\1\\0\\-j \end{bmatrix} \right\}, \left\{ \frac{1}{2}\begin{bmatrix} 1 & 0\\0 & 0\\0 & 1\\0 & 0 \end{bmatrix}, \frac{1}{2}\begin{bmatrix} 0 & 0\\1 & 0\\0 & 0\\0 & 1 \end{bmatrix} \right\},$$

$$\left\{ \frac{1}{2}\begin{bmatrix} 1 & 0\\0 & 1\\0 & 0\\0 & 0 \end{bmatrix}, \frac{1}{2}\begin{bmatrix} 1 & 0\\0 & 0\\0 & 0\\0 & 1 \end{bmatrix}, \frac{1}{2}\begin{bmatrix} 0 & 0\\1 & 0\\0 & 1\\0 & 0 \end{bmatrix}, \frac{1}{2}\begin{bmatrix} 0 & 0\\0 & 1\\1 & 0\\0 & 0 \end{bmatrix}, \frac{1}{2}\begin{bmatrix} 0 & 0\\0 & 0\\1 & 0\\0 & 1 \end{bmatrix}, \frac{1}{2}\begin{bmatrix} 1 & 0 & 0\\0 & 1 & 0\\0 & 0 & 1\\0 & 0 & 0 \end{bmatrix} \right\}.$$

11. A wireless network node, comprising:

at least one processor; and a memory, which is configured to store at least one program;

wherein the at least one program, when executed by the at least one processor, enables the at least one processor to perform operations comprising:

transmitting, to a wireless terminal, a transmission mode comprising at least one of:
- a first transmission mode,
- a second transmission mode,
- a full power transmission mode, or
- a transmission mode supporting indicating whether a transmitted codeword is in a full power state;

receiving, from the wireless terminal, at least one precoding matrix group of at least one codeword; and transmitting, to the wireless terminal, at least one configured codeword; and performing a reception based on power ratio of one of the at least one configured codeword;

wherein the at least one precoding matrix group comprises at least one of at least one Transmitted Precoding Matrix Indicator (TPMI) group, wherein the at least one TPMI group comprises:

$$G8 \quad \left\{ \frac{1}{2}\begin{bmatrix} 1\\1\\0\\0 \end{bmatrix}, \frac{1}{2}\begin{bmatrix} 0\\0\\1\\0 \end{bmatrix} \right\}, \left\{ \frac{1}{2}\begin{bmatrix} 1\\0\\1\\0 \end{bmatrix}, \frac{1}{2}\begin{bmatrix} 1\\0\\-1\\0 \end{bmatrix}, \frac{1}{2}\begin{bmatrix} 1\\0\\j\\0 \end{bmatrix}, \frac{1}{2}\begin{bmatrix} 1\\0\\-j\\0 \end{bmatrix} \right\}, \frac{1}{2}\begin{bmatrix} 1 & 0\\0 & 0\\0 & 1\\0 & 0 \end{bmatrix};$$

$$G9 \quad \left\{ \frac{1}{2}\begin{bmatrix} 1\\1\\0\\0 \end{bmatrix}, \left\{ \frac{1}{2}\begin{bmatrix} 1\\0\\1\\0 \end{bmatrix}, \frac{1}{2}\begin{bmatrix} 1\\0\\-1\\0 \end{bmatrix}, \frac{1}{2}\begin{bmatrix} 1\\0\\j\\0 \end{bmatrix}, \frac{1}{2}\begin{bmatrix} 1\\0\\-j\\0 \end{bmatrix} \right\} \right\},$$

$$\left\{ \frac{1}{2}\begin{bmatrix} 1 & 0\\0 & 0\\0 & 1\\0 & 0 \end{bmatrix}, \frac{1}{2}\begin{bmatrix} 1 & 0\\0 & 1\\0 & 0\\0 & 0 \end{bmatrix}, \frac{1}{2}\begin{bmatrix} 0 & 0\\1 & 0\\0 & 1\\0 & 0 \end{bmatrix} \right\}, \frac{1}{2}\begin{bmatrix} 1 & 0 & 0\\0 & 1 & 0\\0 & 0 & 1\\0 & 0 & 0 \end{bmatrix};$$

$$G10 \quad \left\{ \frac{1}{2}\begin{bmatrix} 1\\1\\0\\0 \end{bmatrix}, \frac{1}{2}\begin{bmatrix} 0\\0\\1\\0 \end{bmatrix} \right\}, \left\{ \frac{1}{2}\begin{bmatrix} 1\\0\\1\\0 \end{bmatrix}, \frac{1}{2}\begin{bmatrix} 1\\0\\-1\\0 \end{bmatrix}, \frac{1}{2}\begin{bmatrix} 1\\0\\j\\0 \end{bmatrix}, \frac{1}{2}\begin{bmatrix} 1\\0\\-j\\0 \end{bmatrix} \right\},$$

$$\left\{ \frac{1}{2}\begin{bmatrix} 1 & 0\\0 & 0\\0 & 1\\0 & 0 \end{bmatrix}, \frac{1}{2}\begin{bmatrix} 1 & 0\\0 & 1\\0 & 0\\0 & 0 \end{bmatrix}, \frac{1}{2}\begin{bmatrix} 0 & 0\\1 & 0\\0 & 1\\0 & 0 \end{bmatrix} \right\}, \frac{1}{2}\begin{bmatrix} 1 & 0 & 0\\0 & 1 & 0\\0 & 0 & 1\\0 & 0 & 0 \end{bmatrix};$$

$$G11 \quad \left\{ \frac{1}{2}\begin{bmatrix} 1\\0\\0\\0 \end{bmatrix}, \frac{1}{2}\begin{bmatrix} 0\\1\\0\\0 \end{bmatrix}, \frac{1}{2}\begin{bmatrix} 0\\0\\1\\0 \end{bmatrix} \right\}, \left\{ \frac{1}{2}\begin{bmatrix} 1\\0\\1\\0 \end{bmatrix}, \frac{1}{2}\begin{bmatrix} 1\\0\\-1\\0 \end{bmatrix}, \frac{1}{2}\begin{bmatrix} 1\\0\\j\\0 \end{bmatrix}, \frac{1}{2}\begin{bmatrix} 1\\0\\-j\\0 \end{bmatrix} \right\},$$

$$\left\{ \frac{1}{2}\begin{bmatrix} 1 & 0\\0 & 0\\0 & 1\\0 & 0 \end{bmatrix}, \frac{1}{2}\begin{bmatrix} 1 & 0\\0 & 1\\0 & 0\\0 & 0 \end{bmatrix}, \frac{1}{2}\begin{bmatrix} 0 & 0\\1 & 0\\0 & 1\\0 & 0 \end{bmatrix} \right\}, \frac{1}{2}\begin{bmatrix} 1 & 0 & 0\\0 & 1 & 0\\0 & 0 & 1\\0 & 0 & 0 \end{bmatrix};$$

$$G13 \quad \left\{ \frac{1}{2}\begin{bmatrix} 1\\0\\0\\0 \end{bmatrix}, \frac{1}{2}\begin{bmatrix} 0\\1\\0\\0 \end{bmatrix} \right\}, \left\{ \frac{1}{2}\begin{bmatrix} 1\\0\\1\\0 \end{bmatrix}, \frac{1}{2}\begin{bmatrix} 1\\0\\-1\\0 \end{bmatrix}, \frac{1}{2}\begin{bmatrix} 1\\0\\j\\0 \end{bmatrix}, \frac{1}{2}\begin{bmatrix} 1\\0\\-j\\0 \end{bmatrix} \right\},$$

$$\left\{ \frac{1}{2}\begin{bmatrix} 0\\1\\0\\1 \end{bmatrix}, \frac{1}{2}\begin{bmatrix} 0\\1\\0\\-1 \end{bmatrix}, \frac{1}{2}\begin{bmatrix} 0\\1\\0\\j \end{bmatrix}, \frac{1}{2}\begin{bmatrix} 0\\1\\0\\-j \end{bmatrix} \right\},$$

$$\left\{ \frac{1}{2}\begin{bmatrix} 1 & 0\\0 & 0\\0 & 1\\0 & 0 \end{bmatrix}, \frac{1}{2}\begin{bmatrix} 0 & 0\\1 & 0\\0 & 0\\0 & 1 \end{bmatrix}, \frac{1}{2}\begin{bmatrix} 1 & 0\\0 & 1\\0 & 0\\0 & 0 \end{bmatrix}, \frac{1}{2}\begin{bmatrix} 1 & 0\\0 & 0\\0 & 0\\0 & 1 \end{bmatrix}, \frac{1}{2}\begin{bmatrix} 0 & 0\\1 & 0\\0 & 1\\0 & 0 \end{bmatrix}, \frac{1}{2}\begin{bmatrix} 0 & 0\\0 & 1\\1 & 0\\0 & 0 \end{bmatrix} \right\},$$

$$\frac{1}{2}\begin{bmatrix} 1 & 0 & 0\\0 & 1 & 0\\0 & 0 & 1\\0 & 0 & 0 \end{bmatrix}; \text{ and}$$

$$G14 \quad \left\{ \frac{1}{2}\begin{bmatrix} 1\\0\\0\\0 \end{bmatrix}, \frac{1}{2}\begin{bmatrix} 0\\1\\0\\0 \end{bmatrix}, \frac{1}{2}\begin{bmatrix} 0\\0\\1\\0 \end{bmatrix} \right\}, \left\{ \frac{1}{2}\begin{bmatrix} 1\\0\\1\\0 \end{bmatrix}, \frac{1}{2}\begin{bmatrix} 1\\0\\-1\\0 \end{bmatrix}, \frac{1}{2}\begin{bmatrix} 1\\0\\j\\0 \end{bmatrix}, \frac{1}{2}\begin{bmatrix} 1\\0\\-j\\0 \end{bmatrix} \right\},$$

$$\left\{ \frac{1}{2}\begin{bmatrix} 0\\1\\0\\1 \end{bmatrix}, \frac{1}{2}\begin{bmatrix} 0\\1\\0\\-1 \end{bmatrix}, \frac{1}{2}\begin{bmatrix} 0\\1\\0\\j \end{bmatrix}, \frac{1}{2}\begin{bmatrix} 0\\1\\0\\-j \end{bmatrix} \right\},$$

$$\left\{ \frac{1}{2}\begin{bmatrix} 1 & 0\\0 & 0\\0 & 1\\0 & 0 \end{bmatrix}, \frac{1}{2}\begin{bmatrix} 0 & 0\\1 & 0\\0 & 0\\0 & 1 \end{bmatrix}, \frac{1}{2}\begin{bmatrix} 1 & 0\\0 & 1\\0 & 0\\0 & 0 \end{bmatrix}, \frac{1}{2}\begin{bmatrix} 1 & 0\\0 & 0\\0 & 0\\0 & 1 \end{bmatrix}, \frac{1}{2}\begin{bmatrix} 0 & 0\\1 & 0\\0 & 1\\0 & 0 \end{bmatrix}, \frac{1}{2}\begin{bmatrix} 0 & 0\\0 & 1\\1 & 0\\0 & 0 \end{bmatrix} \right\},$$

$$\frac{1}{2}\begin{bmatrix} 1 & 0 & 0\\0 & 1 & 0\\0 & 0 & 1\\0 & 0 & 0 \end{bmatrix}, \text{ or}$$

the at least one TPMI group comprises:

$$\left\{\frac{1}{2}\begin{bmatrix}1\\0\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \frac{1}{2}\begin{bmatrix}1&0\\0&0\\0&1\\0&0\end{bmatrix}; \quad G1$$

$$\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1\\1\\0\\0\end{bmatrix}, \frac{1}{2}\begin{bmatrix}1\\-1\\0\\0\end{bmatrix}, \frac{1}{2}\begin{bmatrix}1\\j\\0\\0\end{bmatrix}, \frac{1}{2}\begin{bmatrix}1\\-j\\0\\0\end{bmatrix}\right\}, \quad G2$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$\left\{\frac{1}{2}\begin{bmatrix}1\\1\\0\\0\end{bmatrix}, \frac{1}{2}\begin{bmatrix}1\\-1\\0\\0\end{bmatrix}, \frac{1}{2}\begin{bmatrix}1\\j\\0\\0\end{bmatrix}, \frac{1}{2}\begin{bmatrix}1\\-j\\0\\0\end{bmatrix}\right\}, \quad G4$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$\left\{\frac{1}{2}\begin{bmatrix}1\\0\\0\\0\end{bmatrix}\right\}, \left\{\frac{1}{2}\begin{bmatrix}1\\1\\0\\0\end{bmatrix}, \frac{1}{2}\begin{bmatrix}1\\-1\\0\\0\end{bmatrix}, \frac{1}{2}\begin{bmatrix}1\\j\\0\\0\end{bmatrix}, \frac{1}{2}\begin{bmatrix}1\\-j\\0\\0\end{bmatrix}\right\}, \left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \quad G7$$

$$\frac{1}{2}\begin{bmatrix}1&0&0\\0&1&0\\0&0&1\\0&0&0\end{bmatrix};$$

$$\left\{\frac{1}{2}\begin{bmatrix}1\\0\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \quad G8$$

$$\left\{\frac{1}{2}\begin{bmatrix}1&0\\0&0\\0&1\\0&0\end{bmatrix}, \frac{1}{2}\begin{bmatrix}1&0\\0&1\\0&0\\0&0\end{bmatrix}, \frac{1}{2}\begin{bmatrix}0&0\\1&0\\0&1\\0&0\end{bmatrix}\right\}, \frac{1}{2}\begin{bmatrix}1&0&0\\0&1&0\\0&0&1\\0&0&0\end{bmatrix};$$

$$\left\{\frac{1}{2}\begin{bmatrix}1\\0\\0\\0\end{bmatrix}, \frac{1}{2}\begin{bmatrix}0\\1\\0\\0\end{bmatrix}\right\}, \left\{\frac{1}{2}\begin{bmatrix}1\\1\\0\\0\end{bmatrix}, \frac{1}{2}\begin{bmatrix}1\\-1\\0\\0\end{bmatrix}, \frac{1}{2}\begin{bmatrix}1\\j\\0\\0\end{bmatrix}, \frac{1}{2}\begin{bmatrix}1\\-j\\0\\0\end{bmatrix}\right\}, \quad G10$$

$$\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\},$$

$$\left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}, \frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\},$$

$$\frac{1}{2}\begin{bmatrix}1&0&0\\0&1&0\\0&0&1\\0&0&0\end{bmatrix}; \text{ and}$$

$$\left\{\frac{1}{2}\begin{bmatrix}1\\0\\0\\0\end{bmatrix}, \frac{1}{2}\begin{bmatrix}0\\1\\0\\0\end{bmatrix}, \frac{1}{2}\begin{bmatrix}0\\0\\1\\0\end{bmatrix}\right\}, \left\{\frac{1}{2}\begin{bmatrix}1\\0\\1\\0\end{bmatrix}, \frac{1}{2}\begin{bmatrix}1\\0\\-1\\0\end{bmatrix}, \frac{1}{2}\begin{bmatrix}1\\0\\j\\0\end{bmatrix}, \frac{1}{2}\begin{bmatrix}1\\0\\-j\\0\end{bmatrix}\right\}, \quad G11$$

$$\left\{\frac{1}{2}\begin{bmatrix}0\\1\\0\\1\end{bmatrix}, \frac{1}{2}\begin{bmatrix}0\\1\\0\\-1\end{bmatrix}, \frac{1}{2}\begin{bmatrix}0\\1\\0\\j\end{bmatrix}, \frac{1}{2}\begin{bmatrix}0\\1\\0\\-j\end{bmatrix}\right\}, \left\{\frac{1}{2}\begin{bmatrix}1&0\\0&0\\0&1\\0&0\end{bmatrix}, \frac{1}{2}\begin{bmatrix}0&0\\1&0\\0&0\\0&1\end{bmatrix}\right\},$$

$$\left\{\frac{1}{2}\begin{bmatrix}1&0\\0&1\\0&0\\0&0\end{bmatrix}, \frac{1}{2}\begin{bmatrix}1&0\\0&0\\0&0\\0&1\end{bmatrix}, \frac{1}{2}\begin{bmatrix}0&0\\1&0\\0&1\\0&0\end{bmatrix}, \frac{1}{2}\begin{bmatrix}0&0\\0&0\\1&0\\0&1\end{bmatrix}\right\}, \frac{1}{2}\begin{bmatrix}1&0&0\\0&1&0\\0&0&1\\0&0&0\end{bmatrix}.$$

* * * * *